(12) United States Patent
Fulton

(10) Patent No.: US 11,855,955 B2
(45) Date of Patent: *Dec. 26, 2023

(54) OBSCURED ROUTING

(71) Applicant: Ripple Labs inc., San Francisco, CA (US)

(72) Inventor: Jimmie Fulton, San Francisco, CA (US)

(73) Assignee: RIPPLE LABS INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,765

(22) Filed: Dec. 29, 2022

(65) Prior Publication Data
US 2023/0134929 A1 May 4, 2023

Related U.S. Application Data

(63) Continuation of application No. 17/063,558, filed on Oct. 5, 2020, now Pat. No. 11,552,924, which is a continuation of application No. 16/184,973, filed on Nov. 8, 2018, now Pat. No. 10,798,049.

(51) Int. Cl.
*H04L 45/745* (2022.01)
*H04L 61/45* (2022.01)

(52) U.S. Cl.
CPC ............ *H04L 61/45* (2022.05); *H04L 45/745* (2013.01)

(58) Field of Classification Search
CPC ..... H04L 61/45; H04L 45/745; H04L 63/123; H04L 61/103; H04W 12/102; H04W 12/71
See application file for complete search history.

(56) References Cited

U.S. PATENT DOCUMENTS

| | | | | |
|---|---|---|---|---|
| 7,307,990 | B2 * | 12/2007 | Rosen | H04L 45/00 370/392 |
| 7,467,228 | B2 * | 12/2008 | Roeder | H04L 45/60 709/240 |
| 9,887,913 | B2 * | 2/2018 | Royon | H04L 63/0414 |
| 10,164,794 | B2 * | 12/2018 | Wijnands | H04L 45/745 |
| 10,454,818 | B2 * | 10/2019 | Royon | H04L 67/63 |

(Continued)

FOREIGN PATENT DOCUMENTS

WO 2014055968 A1 4/2014

*Primary Examiner* — Jay P Patel
(74) *Attorney, Agent, or Firm* — Butzel Long

(57) ABSTRACT

Systems and techniques are provided for obscured routing. A computing device may send stacks of identifiers to neighbor computing devices in a network. Each stack of identifiers may include a unique identifier for the neighbor computing device to which it is sent. The computing device may send a notification identifying a destination computing device to the neighbor computing devices. The computing device may receive stacks of identifiers from the neighbor computing devices. The received stacks of identifiers may include completed routes to the destination computing device. Each completed route may be specified by unique identifiers added to the stack of identifiers by computing devices in the network. A unique identifier in each stack of identifiers may not be resolvable to an address by the computing device. The computing device may send a message a neighbor computing device based on a unique identifier in a chosen stack of identifiers.

18 Claims, 23 Drawing Sheets

(56) References Cited

U.S. PATENT DOCUMENTS

| | | | |
|---|---|---|---|
| 10,574,479 B2* | 2/2020 | Wijnands | H04L 45/7452 |
| 10,938,951 B2* | 3/2021 | White | H04L 67/63 |
| 11,303,470 B2* | 4/2022 | Wijnands | H04L 45/7452 |
| 2005/0050223 A1* | 3/2005 | Roeder | H04L 45/02 |
| | | | 709/238 |
| 2010/0125675 A1 | 5/2010 | Richardson | |
| 2011/0044204 A1* | 2/2011 | Tsai | H04L 61/2575 |
| | | | 370/254 |
| 2014/0269421 A1 | 9/2014 | Previdi | |
| 2014/0269721 A1 | 9/2014 | Bashandy | |
| 2015/0381406 A1 | 12/2015 | Francois | |
| 2017/0012867 A1* | 1/2017 | Royon | H04L 63/0414 |
| 2017/0244631 A1 | 8/2017 | Guichard | |
| 2017/0366458 A1 | 12/2017 | Chan | |
| 2018/0041420 A1 | 2/2018 | Saad | |
| 2018/0083868 A1 | 3/2018 | Cheng | |
| 2018/0139126 A1* | 5/2018 | Royon | H04L 63/0414 |
| 2018/0316520 A1 | 11/2018 | Wijnands | |
| 2018/0375968 A1 | 12/2018 | Bashandy | |
| 2019/0007326 A1 | 1/2019 | Clemm | |
| 2019/0013964 A1* | 1/2019 | Wijnands | H04L 12/4625 |
| 2019/0089811 A1* | 3/2019 | White | H04L 45/16 |
| 2019/0149451 A1 | 5/2019 | Sahlqvist | |
| 2019/0158370 A1* | 5/2019 | You | H04W 4/70 |
| 2019/0215267 A1 | 7/2019 | Filsfils | |
| 2019/0296922 A1 | 9/2019 | Dutta | |
| 2020/0169432 A1* | 5/2020 | Wijnands | H04L 45/50 |
| 2023/0134929 A1* | 5/2023 | Fulton | H04L 45/745 |
| | | | 370/392 |

* cited by examiner

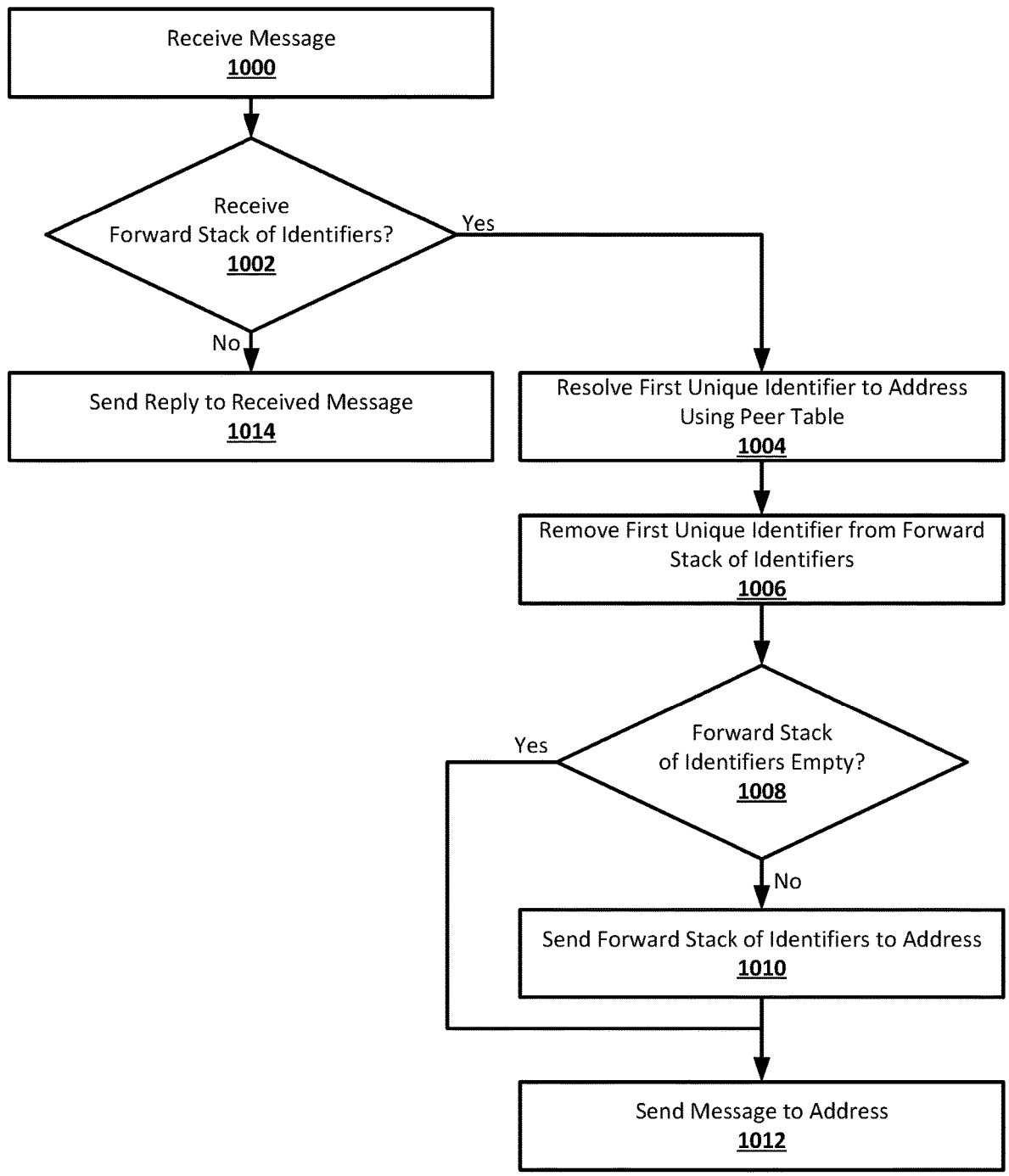

OBSCURED ROUTING

BACKGROUND

Routing in some types of network may require that an originator of a message in the network know the route the message will take through the network before sending the message. The originator of the message may need to generate a listing of the entire route, including any intermediary nodes in the network. This may ensure that the originator of the message is certain that the message will be able to reach its destination before the message is sent.

BRIEF SUMMARY

In an implementation, a first node computing device may send a separate forward stack of identifiers to neighbor node computing devices in a network. Each separate forward stack of identifiers may include a unique identifier for the neighbor node computing device to which it is sent.

The first node computing device may send a notification including an indication of a destination node computing device in the network to each of the neighbor node computing devices along with the forward stacks of identifiers.

The first node computing device may receive forward stacks of identifiers from the neighbor node computing devices. The received forward stacks of identifiers may include completed routes to the destination node computing device. Each completed route may be specified by unique identifiers added to the forward stack of identifiers by node computing devices in the network. A unique identifier in each of the forward stacks of identifiers may not be resolvable to an address by the first node computing device.

The first node computing device may send a message to one of the neighbor node computing devices based on a first unique identifier in a chosen one of the received forward stacks of identifiers.

Systems and techniques disclosed herein may allow for obscured routing. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 10A shows an example procedure suitable for obscured routing according to an implementation of the disclosed subject matter.

DETAILED DESCRIPTION

Figure 1:
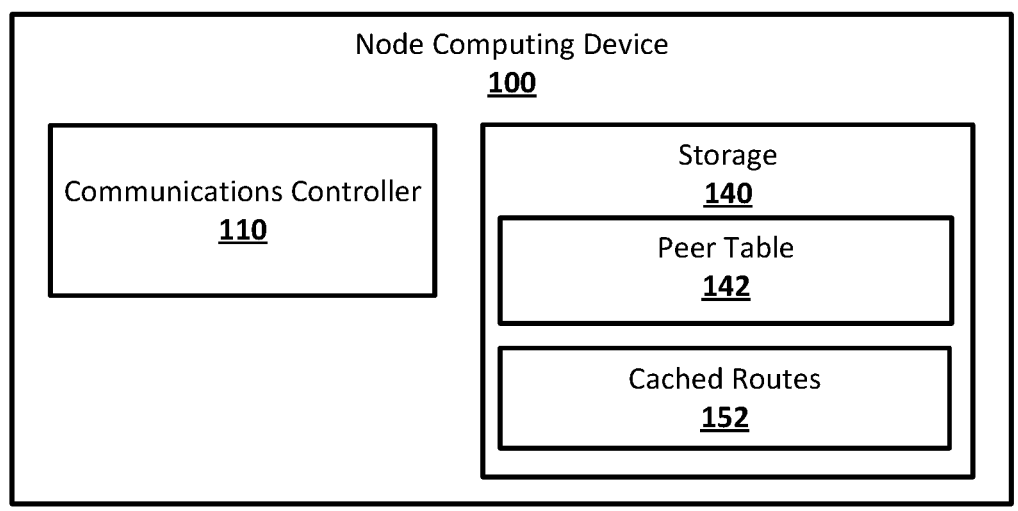
FIG. 1 shows an example system suitable for obscured routing according to an implementation of the disclosed subject matter.

According to embodiments disclosed herein, obscured routing may allow for an originator of a message in a network to generate the entire route for the message while concealing the identity of intermediate nodes from the originator and from other intermediate nodes. A network may have a number of nodes. An individual node in the network may be connected directly to its immediate neighbor nodes and may know non-neighbor nodes, but may not know which nodes its neighbor nodes and non-neighbor nodes are directly connected to. A node which is directly connected to another node may be able to pass a message directly to that node if it is a neighbor node. A node may wish to send a message to another node in the network which is not one of its neighbor nodes. The originator node for the message may know the identity, or network address, of the destination node for the message. The destination node may not be a neighbor to the originator node, or to any neighbors of the originator node. The originator node may send a notification to its neighbor nodes that it intends to send a message to the destination node. The neighbor nodes may send the notification to their neighbor nodes, and so on until a neighbor node of the destination node receives the notification. A node may not send the notification to the neighbor node from which it received the notification to prevent cyclical propagation of the notification. Each node that receives the notification may, before passing the notification on to one its neighbor nodes, add a unique identifier for that neighbor node to a forward stack of identifiers. When the notification arrives at a neighbor node of the destination node, the forward stack of identifiers sent along with the notification may include a full route from the originator node to the destination node. Stacks of identifiers that reach a neighbor node of the destination node may be passed back to the originator node, which may choose one of the stacks of identifiers to use to send the message to the destination node. Each unique identifier in a forward stack of identifiers may be resolvable to the node it identifies only by the node that added it to the stack. This may allow for the creation of routes through a network that obscures the entirety of the route from all nodes in the route. Each node in the route may only be able determine the identity of its neighbor nodes in the route from a forward stack of identifiers.

A network may include any suitable number of nodes. The nodes may be, for example, single computing devices, multiple connected computing devices, individual servers, server farms, or distributed server systems, or virtual computing devices or systems. The nodes may be connected in any suitable manner, including, for example, wired and wireless data connections. The connections may be over any combination of the Internet and private networks. For example, the nodes of a network may be computer systems belonging to financial institutions. The network may be used by the financial institutions to communicate data regarding financial transactions, for example, in the completion of payments between financial institutions.

Each node in a network may store data on its neighbor nodes in the network. For example, a node may store a peer table. The peer table stored on a node may include an entry for each of its neighbor nodes. An entry for a neighbor node may include an address that can be used to send messages to the neighbor node, such as, for example, an IP address and port number, and a unique identifier for the neighbor node. The unique identifier may be unique to the node in which the peer table is stored. The same node may be a neighbor node to any number of other nodes, and the unique identifier for that neighbor node may be different in the peer tables on each of the other nodes. An entry for a neighbor node in a peer table may also include data indicating other nodes that may possibly be reached from the neighbor node.

A node in a network may wish to send a message to another node in the network. The message may be, for example, any suitable data in any suitable format that may be communicated across the network. For example, the message may be encapsulated in IP packets of any suitable type to be transmitted across the network. The node that wishes to send the message may be the originator node for the message, and the node to which the message is being sent may be the destination node for the message. The originator node may send a notification to its neighbor node indicating that the originator node wishes to send a message to the destination node. The originator node may send the notification to all of its neighbor nodes, or may only notify neighbor nodes from which the destination node may possibly be reached as indicated by data in the originator node's peer table. The originator node may look up each neighbor node to which it will send a notification in the originator node's peer table and retrieve the unique identifier that the originator node uses for the neighbor node. The unique identifier for the neighbor node may be used to start a forward stack of identifiers that may be sent along with the notification from the originator node.

A node that receives the notification from the originator node may notify its own neighbor nodes. The node may look up each neighbor node to which it will send the notification and forward stack of identifiers in the node's peer table and retrieve the unique identifier that the node uses for the neighbor node. The unique identifier for the neighbor node may be added to the top of the forward stack of identifiers that may be sent along with the notification that was received from the originator node. The node may send the notification and forward stack of identifiers to all of its neighbor nodes except for the neighbor node from which it received the notification, or may only notify neighbor nodes from which the destination node may possibly be reached as indicated by data in the node's peer table.

Each node that receives a notification from another node and is not a neighbor node of the destination node may handle the notification in the same manner as the nodes that received the notification from the originator node. This may result in any forward stack of identifiers that reaches a neighbor node of the destination node, along with the notification, including a complete route through the network from the originator node to the destination node. A forward stack of identifiers that reaches a neighbor node of the destination node along with the notification from the originator node may include a unique identifier for each node on the route the notification took from the originator node. The neighbor node to the destination node may add its own unique identifier for the destination node to the forward stack of identifiers, completing the route. Each unique identifier may only be resolvable to an address of a node using the peer table of the node that added the unique identifier to the forward stack of identifiers. This may prevent any node in a route from being able to identify any of the other nodes in the route that are not its neighbor nodes.

Stacks of identifiers that reach a neighbor node of the destination node may be returned to the originator node in any suitable manner. For example, the forward stack of identifiers may be returned through open connections between the nodes on the route included in the forward stack of identifiers. The originator node may maintain an open connection to each neighbor node to which the originator node sends the notification. Each node that sends the notification to its own neighbor nodes may maintain an open connection to each of those neighbor nodes. When a node that is a neighbor node to the destination node receives a forward stack of identifiers along with the notification, the node may complete the route by adding its own unique identifier for the destination node to the forward stack of identifiers. The node may then pass back the forward stack of identifiers to the node from which it received the notification using the still open connection. That node in turn may pass back the forward stack of identifiers to the node it received notification from using the still open connection, and so on using open connections until the forward stack of identifiers reaches the originator node.

There may be a limit on the length of a route in the network. The limit may be set by the originator node when it sends out the notification, or the limit may be set by, for example, a policy of the network. For example, the limit may be set at six hops. This may cause a node that both receives a forward stack of identifiers that already includes five unique identifiers and is not a neighbor node to the destination node to indicate that the route in the forward stack of identifiers has failed. The node may pass the forward stack of identifiers back to the originator node with an indication that the route has failed, or may pass a failure message back to the originator node. The limit on the length of the route may prevent notifications and forward stacks of identifiers from being passed around a network indefinitely without ever reaching the destination node.

The originator node may use a forward stack of identifiers to send a message to the destination node. The originator node may receive any number of forward stacks of identifiers that include complete route to the destination node. The originator node may choose a forward stack of identifiers to use to send the message based on any suitable criteria. For example, the originator node may choose the shortest forward stack of identifiers, which may include the route with the fewest number of nodes or may choose a forward stack of identifiers that uses a neighbor node that is most trusted by the originator node.

The originator node may look up the unique identifier at the bottom of the forward stack of identifiers in its peer table. This may be the unique identifier that was added to the forward stack of identifiers by the originator node before the notification was sent. The look-up may resolve the unique identifier to an address of a neighbor node of the originator node. The originator node may remove the unique identifier for the neighbor node from the forward stack of identifiers, and may use the address to send the message to the neighbor node along with the forward stack of identifiers.

The neighbor node of the originator node may receive the message and the forward stack of identifiers from the originator node. The neighbor node may look up the unique identifier at the bottom of the forward stack of identifiers. This may now be the unique identifier that was added to the forward stack of identifiers by the neighbor node of the originator node. The unique identifier for the neighbor node of the originator node, added by the originator node, may have been removed from the forward stack of identifiers by the originator node. The look-up may resolve the unique identifier to an address of a neighbor node of the neighbor node to the originator node. The neighbor node of the originator node may remove the unique identifier for its neighbor node from the forward stack of identifiers, and may use the address to send the message to its neighbor node along with the forward stack of identifiers.

Each node that receives the message and forward stack of identifiers may repeat the actions of the neighbor node of the originator node until the forward stack of identifiers is empty. The node that receives the message but no forward stack of identifiers may be the destination node, as its neighbor node in the route may have been the last node the added a unique identifier to the forward stack of identifiers. The message may thus be delivered from the originator node to the destination node using the route specified in the forward stack of identifiers. Each node that receives the forward stack of identifiers may only be able to resolve the unique identifier for its own neighbor node, as the unique identifiers may be unique to each node such that the same node may be identified by different unique identifiers in the peer tables of different nodes. Each node in the route after the originator node may therefore only be able to identify its immediate neighbor nodes in the route. The originator node may only know its neighbor node in the route and the destination node. The destination node may know its neighbor in the route, and may know the originator node if the message includes information identifying the originator node.

In some implementations, messaging between the originator node and the destination node may be synchronous. The originator node may maintain an open connection with its neighbor node in the route in the forward stack of identifiers after the message is sent from the originator node to the neighbor node. Each node in the route may likewise maintain an open connection to its neighbor node that is the next node in the route after sending the message to that neighbor node. Once the message has reached the destination node using the route in the forward stack of identifiers, there may be open connections between each node in the route from the originator node to the destination node. This may allow messages to be passed back and forth across the nodes in the route between the originator node and the destination node without requiring any further use of the forward stack of identifiers or any additional peer table look-ups by any nodes in the route. The connections may be closed at any suitable time, in any suitable manner, by any suitable node in the route.

In some implementations, messaging between the originator node and the destination node may be asynchronous. The originator node may disconnect from its neighbor node in the route in the forward stack of identifiers after the message is sent from the originator node to the neighbor node. Each node in the route may likewise disconnect from its neighbor node that is the next node in the route after sending the message to that neighbor node. A return stack of identifiers may be used to allow for messages to be sent back to the originator node from the destination node using the nodes in the route in the forward stack of identifiers.

The return stack of identifiers may be started by the node in the route that is the neighbor node of the originator node. The neighbor node of the originator node may look up the originator node in the neighbor node's peer table and retrieve the unique identifier that the neighbor node of the originator node uses for the originator node. The unique identifier for the originator node may be used to start the return stack of identifiers. The return stack of identifiers may be included with the forward stack of identifiers and the message sent from the neighbor node of the originator node to the next node in the route.

Each node that receives the message, forward stack of identifiers, and return stack of identifiers from one of its neighbor nodes in the route may look up that neighbor node in the node's peer table and retrieve the unique identifier that the node uses for the neighbor node. The unique identifier for the neighbor node from which the message was received may be added to the top of the return stack of identifiers. In this way, each node may add to the return stack of identifiers that node's unique identifier for the neighbor node from which it receives the message as the message travels from the originator node to the destination node. When the message reaches the destination node, the destination node may likewise lookup its unique identifier for the node it received the message from and add it to the top of the return stack of identifiers. The return stack of identifiers may include a route back to the originator node from the destination node that goes through the same nodes in the route that was in the forward stack of identifiers that was used by the originator node. The forward stack of identifiers may be empty. Each unique identifier in the return stack of identifiers may only be resolvable to an address of a node using the peer table of the node that added the unique identifier to the return stack of identifiers. This may prevent any node in a route from being able to identify any of the other nodes in the route that are not its neighbor nodes. The destination node may use the return stack of identifiers to send a message to the originator node in the same manner that the originator node used the forward stack of identifiers to send its message to the destination node.

An originator node may receive more than one forward stack of identifiers after sending out a notification of its intent to send a message. The originator node may choose which forward stack of identifiers to use to send the message based on, for example, costs associated with the forward stacks of identifiers. Different types of networks may include different types of costs associated with stacks of identifiers. For example, the costs may be financial costs, including, for example, tolls or fees that may be charged to the originator node for sending a message using certain nodes, or for using the connections between nodes. Financial costs may also be transaction fees imposed by financial institutions when the network is a network of financial institutions and the message is related to the completion of transactions at the originator node and destination node, for example, as in correspondent banking. The costs may also be, for example, latency in delivering a message between nodes. For example, a forward stack of identifiers with a longer route through a communication network may have a lower cost than another forward stack of identifiers with a shorter route due to high latency between nodes on the shorter route. The originator nodes may determine the cost of a forward route in any suitable manner. For example, the originator node may use the forward stack of identifiers to send a quote request across the route in the same manner that a message would be sent. Each node that receives the quote request may append its cost, which may be a cost imposed by the node itself or a cost of reaching that node from its neighbor node, to the quote request. When the quote request reaches the destination node, the destination node may append its cost to the quote request, which may then be returned to the originator node. The quote request may be returned across open connections in synchronous messaging, or using a return stack of identifiers in asynchronous messaging. The quote request may allow the originator node to see the costs associated with each hop and node in the route of the forward stack of identifiers, but the nodes may still only be identified using their unique identifiers from the forward stack of identifiers. This may prevent the originator node from determining the identity of any of the nodes in the route that are the destination node or neighbor nodes to the originator node A stack of identifiers may be cached, allowing for reuse of the route in the stack of identifiers. For example, the originator node may cache a forward stack of identifiers used to send a message to a destination node, and the destination node may cache a return stack of identifiers used to send a message back to the originator node. This may allow for the re-use of the routes in the stacks of identifiers without requiring that the routes be re-found. A time-to-live may be associated with a stack of identifiers, so that a cached stack of identifiers may expire at the end of its time-to-live.

In some implementations, the forward stack of identifiers may not be returned to the originator node. Instead, a forward stack of identifiers that includes a route to the destination node may be returned to the node in the route that is the neighbor node of the originator node. This neighbor node may then then inform the originator node that a route has been found to the destination node without revealing additional information about the route. For example, the node may not reveal the length of the route to the originator node. The originator node may decide whether or not to send the message using the route. If the originator node decides to use the route, the message may be sent to the neighbor node to which the forward stack of identifiers was returned, which may then send the message and the forward stack of identifiers to the next node in the route. If the originator node sends out a quote request, the cost of the entire route may be returned to the originator node without any itemization of the costs associated with each node or hop in the route. More than one forward stack of identifiers may be returned to the same neighbor node of the originator node, indicating that more than one route was found from the originator node to the destination node using that neighbor node as the first node in the route after the originator node. The neighbor node may still only inform the originator node that a route starting with the neighbor node has been found, and may not inform the originator node that there is more than one route that starts with the neighbor node available. If the originator node decides to send the message through the neighbor node, the neighbor node may choose the route that is used. This may allow the neighbor node to balance outgoing traffic among its neighbor nodes, and may also present opportunities for the neighbor node to achieve cost savings through volume discounts offered by its neighbor nodes.

Communication between the computing devices and systems that are the nodes of a network may occur directly, for example, between any of the connectors and ledgers, or may be routed in any suitable manner. Communications may occur directly using any suitable communications protocols, such as, for example, HTTPS. In some implementations, instead of messages being sent by one computing device or system to another, a computing device or system may check for a message on another computing device or system. Computing devices and system may communicate using any suitable communications hardware, including, for example, any suitable wired and wireless network adapters.

FIG. 1 shows an example system suitable for obscured routing according to an implementation of the disclosed subject matter. A node computing device 100 may include a communications controller 110 and a storage 140. The node computing device 100 may be any suitable computing device, such as, for example, a computer 20 as described in FIG. 11, or component thereof, for implementing the communications controller 110, and the storage 140. The node computing device 100 may be a single computing device, or may include multiple connected computing devices, and may be, for example, a laptop, a desktop, an individual server, a server farm, or a distributed server system, or may be a virtual computing device or system. The node computing device 100 may be part of a computing system and network infrastructure, or may be otherwise connected to the computing system and network infrastructure. The node computing device 100 may be, for example, a computing device that is part of a financial institution such as a centralized ledger, or may be a distributed computing system such as, for example, a blockchain ledger or other distributed ledger system. The communications controller 110 may be any suitable combination of hardware and software on the node computing device 100 for controlling communications between the node computing device 100 and other node computing devices in a network. The storage 140 may be any suitable hardware storage with any suitable software on, or accessible to, the node computing device 100, and may store a peer table 142 and cached routes 152.

The communications controller 110 may be any suitable combination of hardware and software on the node computing device 100 for controlling communications between the node computing device 100 and other node computing devices in a network. The communications controller 110 may be able to send and receive messages, notifications, quotes, quote requests, and forward and return stacks of identifiers directly to and from any node computing device in the network to which the node computing device 100 has a direct connection. The communications controller 110 may also pass received messages to other components of the node computing device 100 where they may be used in any suitable manner, including, for example, to cause a transfer between accounts tracked by the node computing device 100, which may be a computing device for a financial institution. The communications controller 110 may perform look-ups using the peer table 142 in order to retrieve unique identifiers to be added to forward and return stacks of identifiers, and to resolve unique identifiers removed from forward and return stacks to addresses of node computing devices. The communications controller 110 may use any suitable network communications protocols to communicate with other node computing devices over any suitable type of network connection, including wired and wireless connections, public Internet connections, intranet connections, and public and private wide area network connections. The communications controller 110 may use any suitable security and authentication protocols, including, for example, key-hashed message authentication codes (HMAC) for message authentication.

The storage 140 may be any suitable hardware storage and any suitable software, may be on, or accessible to, the node computing device 100, and may store the peer table 142 and the cached routes 152. The peer table 142 may store entries for each node computing device is the network that is a neighbor node of the node computing device 100. An entry for a neighbor node in the peer table 142 may include an address that can be used to send messages to the neighbor node, such as, for example, an IP address and port number for a node computing device, and a unique identifier used for the neighbor node by the node computing device 100. The unique identifier for a neighbor node to the node computing device 100 in the peer table 142 may be unique to the node computing device 100. An entry for a neighbor node in the peer table 142 may also include data indicating other nodes that may possibly be reached from the neighbor node.

The unique identifiers in the peer table 142 may be generated in any suitable manner. For example, the unique identifiers for a neighbor node in the peer table 142 may be partially based on some data that may be unique to the node computing device 100, such as, for example, MAC addresses of communications devices, which may be, for example, hashed. This hash of data unique to the node computing device 100 may be combined with, for example, a randomly generated string of characters to create the unique identifier for the neighbor node. The use of data unique to the node computing device 100 may ensure that the unique identifiers in the peer table 142 don't collide with unique identifiers in the peer tables of other node computing devices. In some implementations, the unique identifiers may be generated in a manner that does not ensure a lack of collisions. In the event of a collision where two node computing devices assign the same unique identifier to a common neighbor node, neither node computing device could ever be certain that a collision had occurred. Neither node computing device can be sure what address the other node computing device would resolve the collided unique identifier to, and therefore what node computing device the collided unique identifier represents. Thus, even if both node computing devices resolve the collided identifier to the same address, for the node computing device that is a common neighbor to them, and both saw the collided unique identifier in a stack of identifiers where it was placed by the other node computing device, neither of the node computing devices could be certain that the other node computing device would resolve the unique identifier to the address for the common neighbor node.

Figure 2:
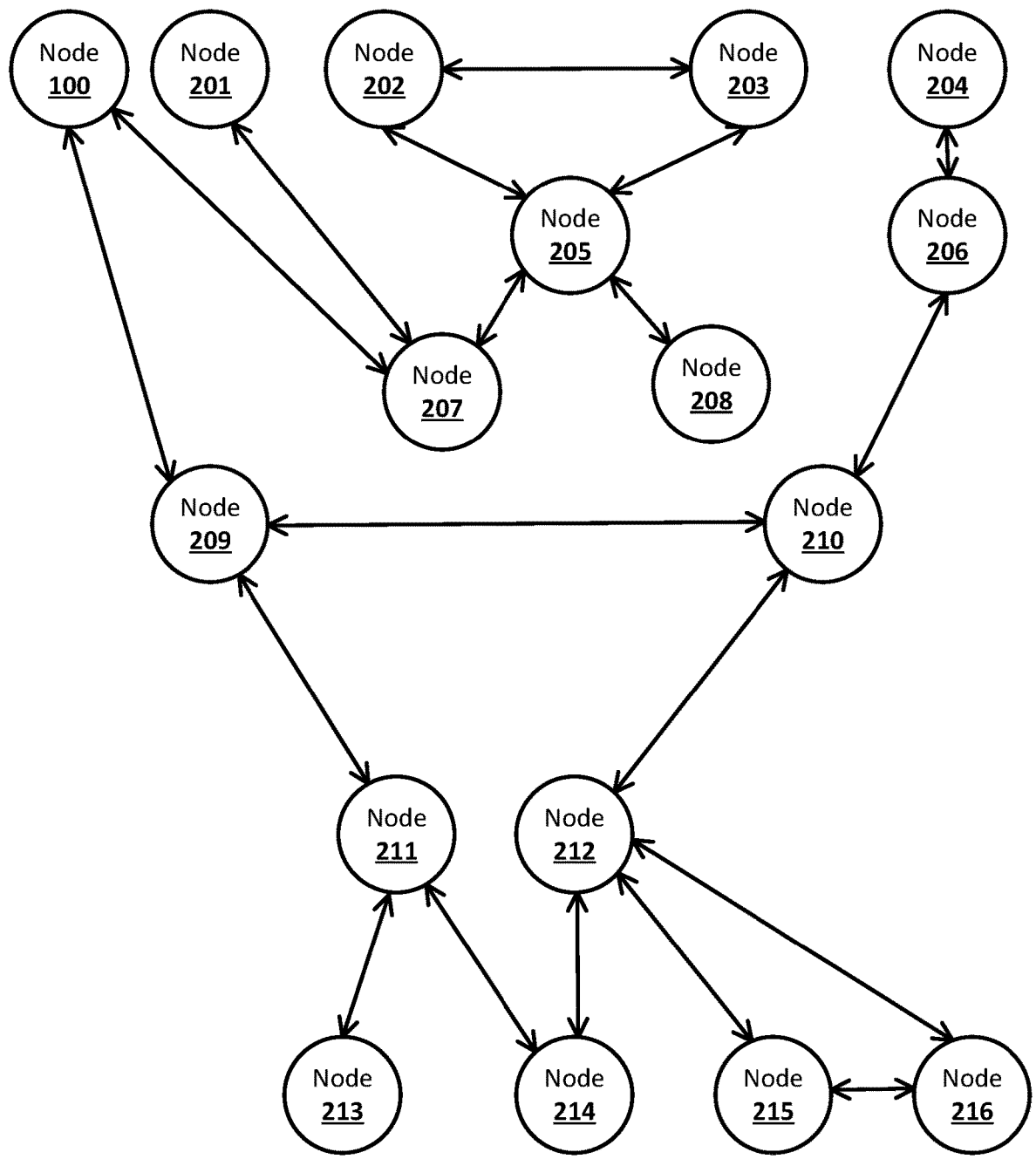
FIG. 2 shows an example system suitable for obscured routing according to an implementation of the disclosed subject matter.

FIG. 2 shows an example system suitable for obscured routing according to an implementation of the disclosed subject matter. A network may be formed from any number of nodes, which may be, for example, node computing devices 100, 201, 202, 203, 204, 205, 206, 207, 208, 209, 210, 211, 212, 213, 214, 215, and 216. The node computing devices 100, 201, 202, 203, 204, 205, 206, 207, 208, 209, 210, 211, 212, 213, 214, 215, and 216 in the network may be connected in any suitable manner, for example, using any suitable type of communications links. In some networks, nodes which may be connected by a communications link may not be connected within the network, for example, due to lack of proper arrangements between the nodes. For example, in a financial network, the computing devices of two financial institutions may be able to communicate over the Internet, but may not be connected within the financial network due to lack of arraignments between the financial institutions. This may prevent the financial institutions from delivering payments to each other directly, requiring that such payments be routed through other nodes, for example, the computing devices of other financial institutions, within the network.

The node computing devices 100, 201, 202, 203, 204, 205, 206, 207, 208, 209, 210, 211, 212, 213, 214, 215, and 216 that are directly connected to each other may be neighbor nodes in the network. For example, the node computing device 100 may be neighbor nodes with the node computing devices 207 and 209. The node computing device 201 may be neighbor nodes with the node computing device 207. The node computing device 202 may be neighbor nodes with the node computing devices 203 and 205. The node computing device 203 may be neighbor nodes with the node computing devices 202 and 205. The node computing device 204 may be neighbor nodes with the node computing devices 206. The node computing device 205 may be neighbor nodes with the node computing devices 202, 203, 207, and 208. The node computing device 206 may be neighbor nodes with the node computing devices 204 and 210. The node computing device 207 may be neighbor nodes with the node computing devices 100 and 201. The node computing device 208 may be neighbor nodes with the node computing device 205. The node computing device 209 may be neighbor nodes with the node computing devices 100, 201, 210, and 211. The node computing device 210 may be neighbor nodes with the node computing devices 206, 209 and 212. The node computing device 211 may be neighbor nodes with the node computing devices 209, 213, and 214. The node computing device 212 may be neighbor nodes with the node computing devices 210, 214, and 215. The node computing device 213 may be neighbor nodes with the node computing device 211. The node computing device 214 may be neighbor nodes with the node computing devices 211 and 212. The node computing device 215 may be neighbor nodes with the node computing devices 212 and 216. The node computing device 216 may be neighbor nodes with the node computing devices 212 and 215.

Figure 3A:
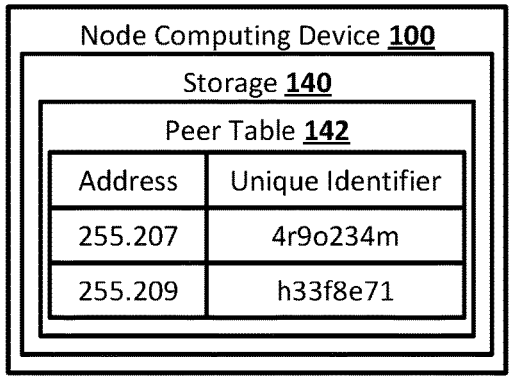
FIG. 3A shows an example arrangement suitable for obscured routing according to an implementation of the disclosed subject matter.
Figure 3A:
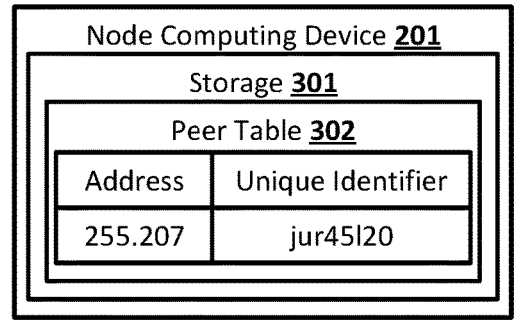
Figure 3A:
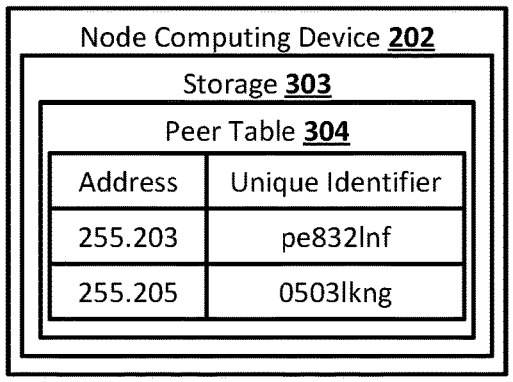
Figure 3A:
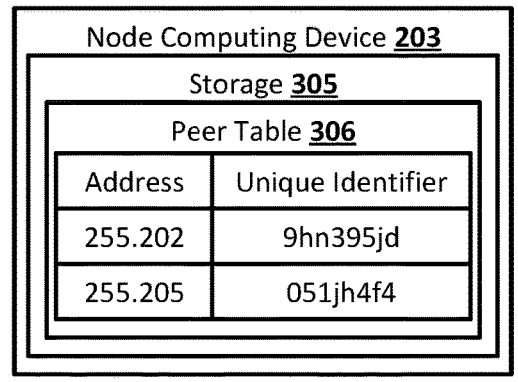
Figure 3A:
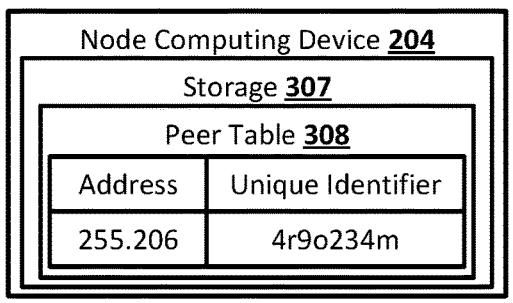
Figure 3A:
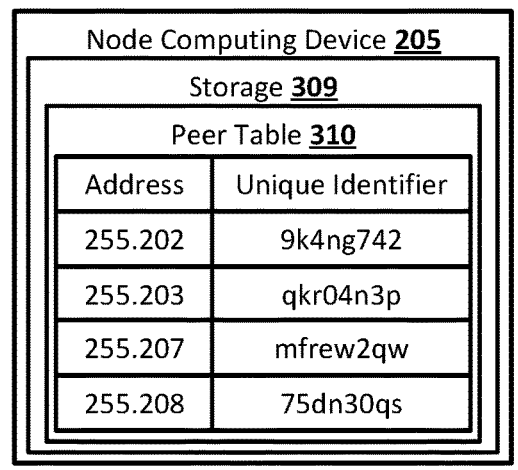
Figure 3B:
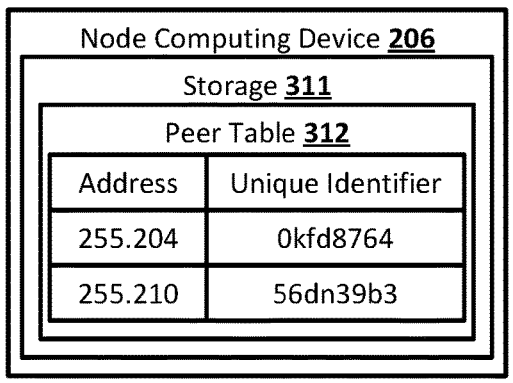
FIG. 3B shows an example arrangement suitable for obscured routing according to an implementation of the disclosed subject matter.
Figure 3B:
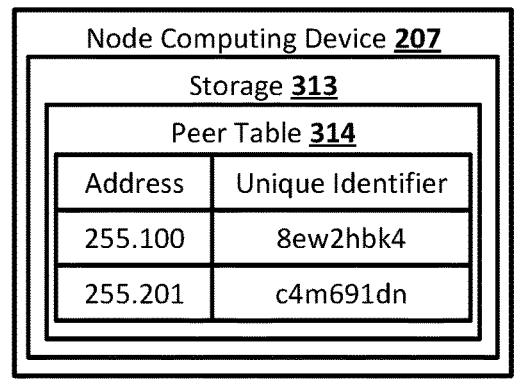
Figure 3B:
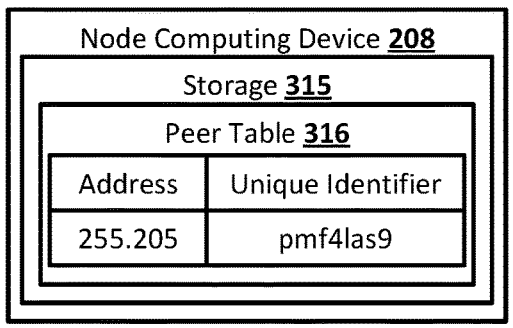
Figure 3B:
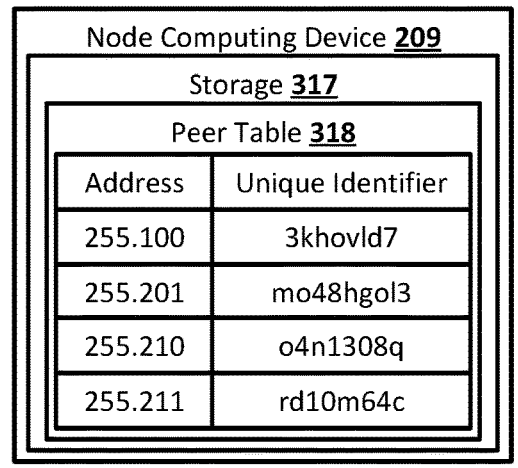
Figure 3B:
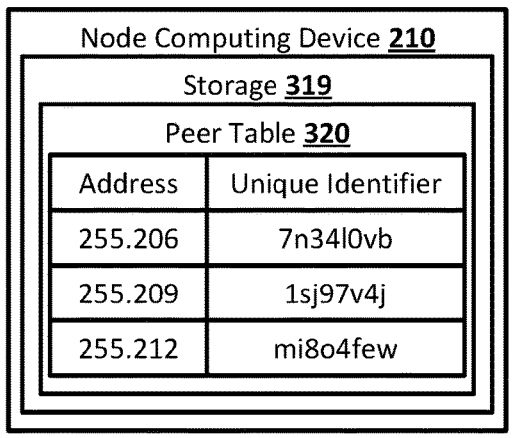
Figure 3B:
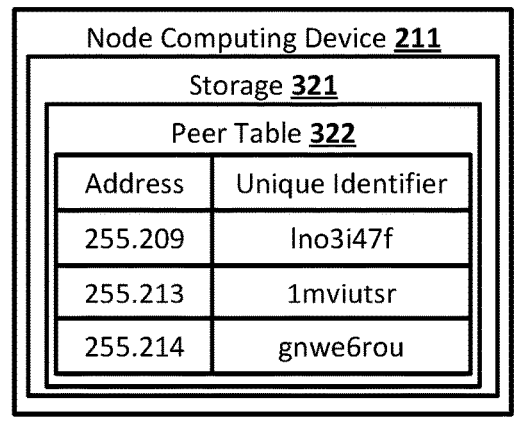
Figure 3C:
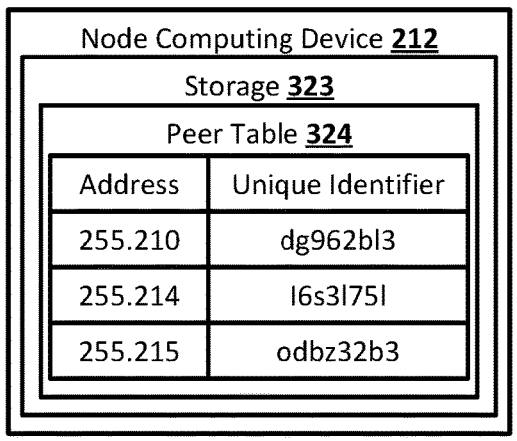
FIG. 3C shows an example arrangement suitable for obscured routing according to an implementation of the disclosed subject matter.
Figure 3C:
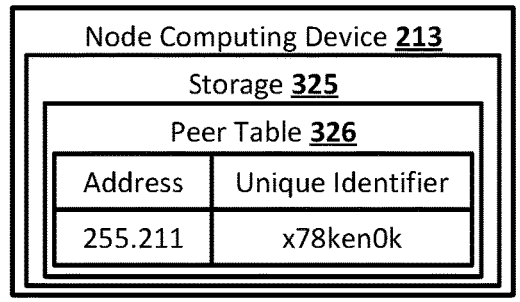
Figure 3C:
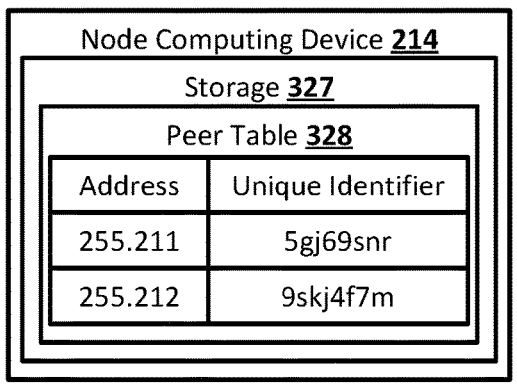
Figure 3C:
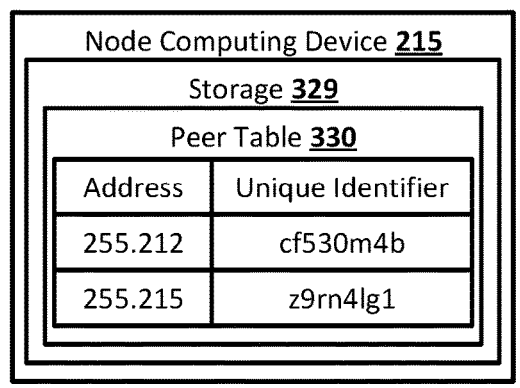
Figure 3C:
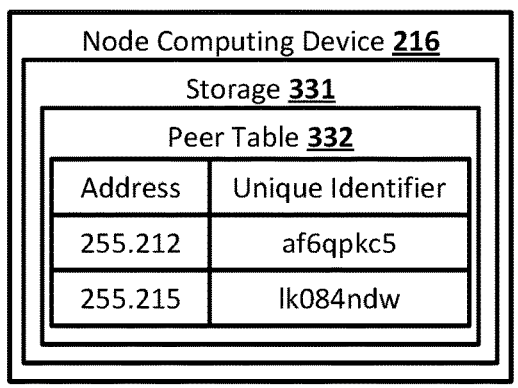

FIG. 3A shows an example arrangement suitable for obscured routing according to an implementation of the disclosed subject matter. Each of the node computing devices 100, 201, 202, 203, 204, 205, 206, 207, 208, 209, 210, 211, 212, 213, 214, 215, and 216 in the network may store a peer table. Each peer table may include a listing of addresses of neighbor nodes and unique identifiers for the neighbor nodes.

The node computing device 100 may store the peer table 142 in the storage 140. The peer table 142 may include addresses and unique identifiers for the node computing devices 207 and 209, which may be the neighbor nodes of the node computing device 100.

The node computing device 201 may store a peer table 302 in a storage 301. The peer table 302 may include an address and unique identifier for the node computing device 207, which may be the neighbor node of the node computing device 201.

The node computing device 202 may store a peer table 304 in a storage 303. The peer table 304 may include addresses and unique identifiers for the node computing devices 203 and 205, which may be the neighbor nodes of the node computing device 202.

The node computing device 203 may store a peer table 306 in a storage 305. The peer table 306 may include addresses and unique identifiers for the node computing devices 202 and 205, which may be the neighbor nodes of the node computing device 203.

The node computing device 204 may store a peer table 308 in a storage 307. The peer table 308 may include an address and unique identifier for the node computing device 206, which may be the neighbor node of the node computing device 204.

The node computing device 205 may store a peer table 310 in a storage 309. The peer table 310 may include addresses and unique identifiers for the node computing devices 202, 203, 207 and 208, which may be the neighbor nodes of the node computing device 205.

The node computing device 206 may store a peer table 312 in a storage 311. The peer table 312 may include addresses and unique identifiers for the node computing devices 204 and 210, which may be the neighbor nodes of the node computing device 206.

The node computing device 207 may store a peer table 314 in a storage 313. The peer table 314 may include addresses and unique identifiers for the node computing devices 100 and 201, which may be the neighbor nodes of the node computing device 207.

The node computing device 208 may store a peer table 316 in a storage 315. The peer table 316 may include an address and unique identifier for the node computing device 205, which may be the neighbor node of the node computing device 208.

The node computing device 209 may store a peer table 318 in a storage 317. The peer table 318 may include addresses and unique identifiers for the node computing devices 100, 201, 210, and 211, which may be the neighbor nodes of the node computing device 209.

The node computing device 210 may store a peer table 320 in a storage 319. The peer table 320 may include addresses and unique identifiers for the node computing devices 206, 209, and 212, which may be the neighbor nodes of the node computing device 210.

The node computing device 211 may store a peer table 322 in a storage 321. The peer table 322 may include addresses and unique identifiers for the node computing devices 209, 213, and 214, which may be the neighbor nodes of the node computing device 211.

The node computing device 212 may store a peer table 324 in a storage 323. The peer table 324 may include addresses and unique identifiers for the node computing devices 210, 214, and 215, which may be the neighbor nodes of the node computing device 212.

The node computing device 213 may store a peer table 326 in a storage 325. The peer table 326 may include an address and unique identifier for the node computing device 211, which may be the neighbor node of the node computing device 213.

The node computing device 214 may store a peer table 328 in a storage 327. The peer table 328 may include addresses and unique identifiers for the node computing devices 211 and 212, which may be the neighbor nodes of the node computing device 214.

The node computing device 215 may store a peer table 330 in a storage 329. The peer table 330 may include addresses and unique identifiers for the node computing devices 212 and 215, which may be the neighbor nodes of the node computing device 215.

The node computing device 216 may store a peer table 332 in a storage 331. The peer table 332 may include addresses and unique identifiers for the node computing devices 212 and 215, which may be the neighbor nodes of the node computing device 216.

The peer tables may also include data about a neighbor node that may indicate which other nodes in the network may be reachable through the neighbor node. For example, an entry for a neighbor node in a peer table may include an IP subnet mask indicating portions of the internet that may be reachable from the neighbor node. Other network types may also use hierarchical data structures as addresses of a node computing devices, allowing for subnet masks. For example, the address of a node computing device for a financial institution may have a hierarchical structure of global region, country within that region, state or territory within that country, city within the state or territory, and specific financial institution within that city. For example, NA.US.CA.SF.GB may be the address of a node computing device for Generic Bank (GB) located in San Francisco (SF), California (CA), the United States (US), North America (NA). An entry in a peer table for a neighbor node may include a subnet mask of NA.US.*, which may indicate that the neighbor node is capable of reaching the node computing device for any financial institution located in the United States. An entry may include multiple subnet masks. This may allow a node computing device to determine whether it is useful to send a notification to a neighbor node. For example, if then entry for a neighbor node only includes NA.US.*, that neighbor node may not be useful when the destination node computing device is located in France.

Figure 4A:
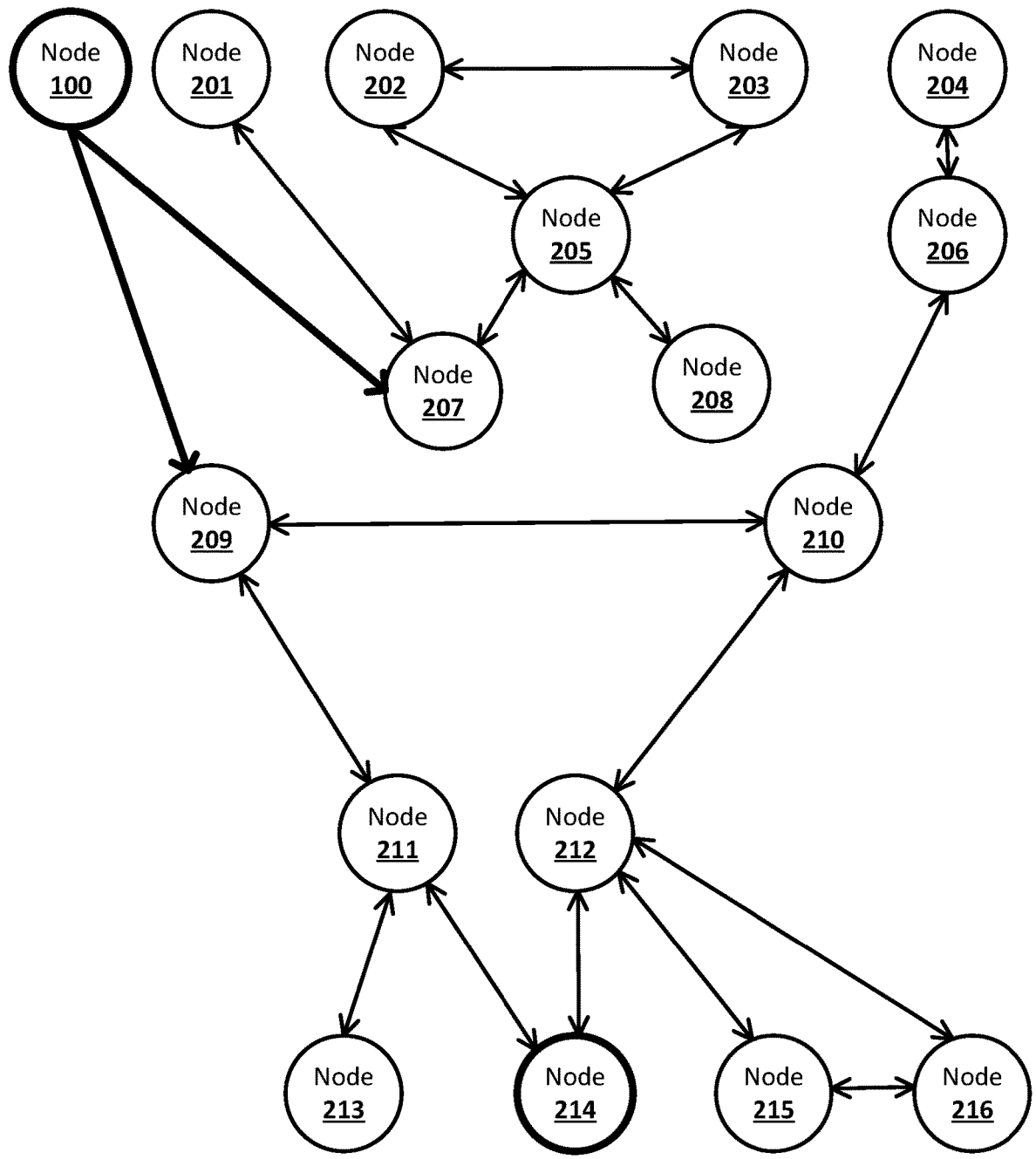
FIG. 4A shows an example system suitable for obscured routing according to an implementation of the disclosed subject matter.

FIG. 4A shows an example system suitable for obscured routing according to an implementation of the disclosed subject matter. The node computing device 100 may wish to send a message to the node computing device 214. The node computing device 100 may send a notification to its neighbor nodes, node computing devices 207 and 209. The node computing device may create separate forward stacks of identifiers with the unique identifiers from the peer table 142 for the node computing devices 207 and 209. The forward stack of identifiers with the unique identifier for the node computing device 207 may be sent to the node computing device 207. The forward stack of identifiers with the unique identifier for the node computing device 209 may be sent to the node computing device 209.

Figure 4B:
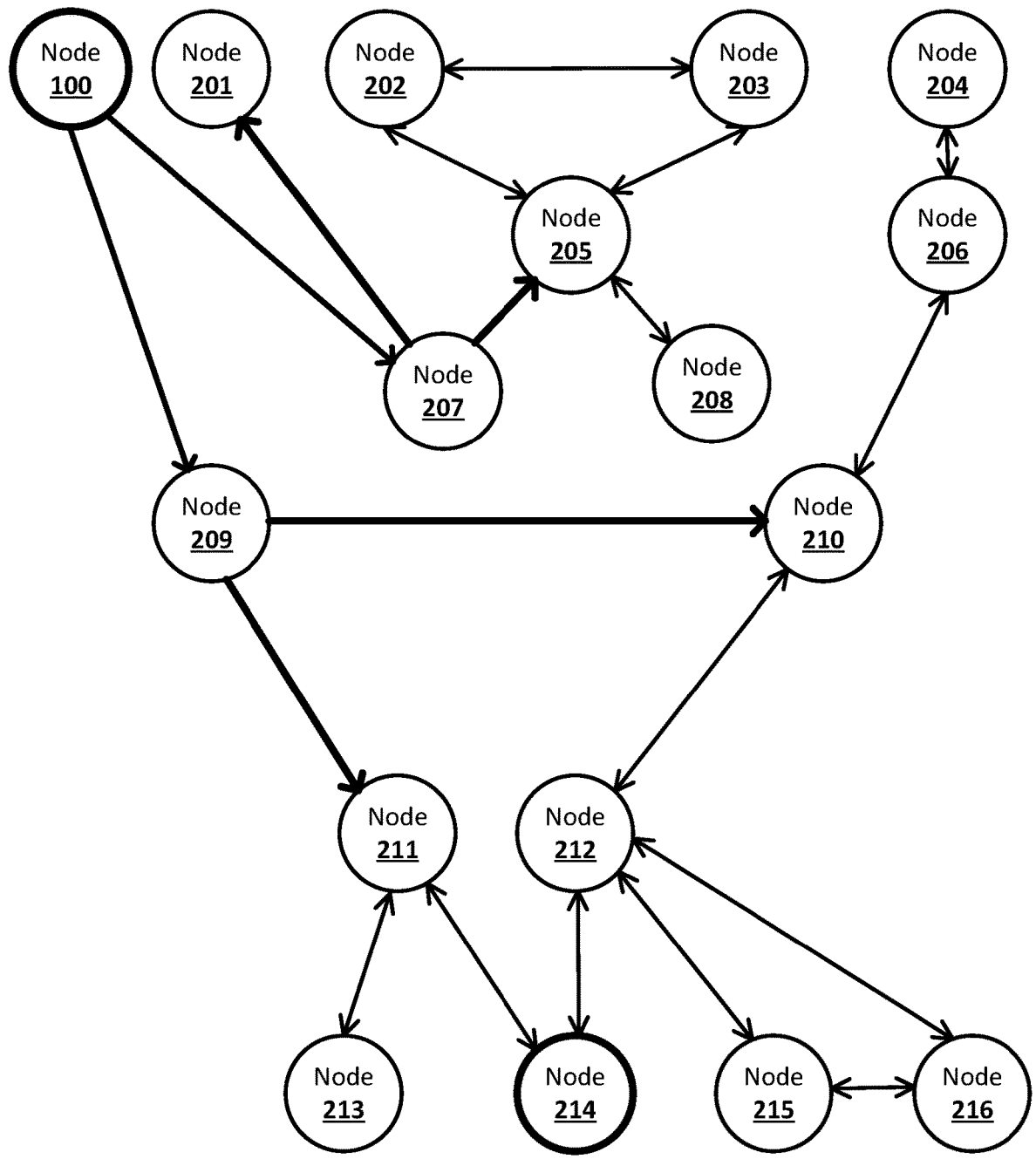
FIG. 4B shows an example system suitable for obscured routing according to an implementation of the disclosed subject matter.

FIG. 4B shows an example system suitable for obscured routing according to an implementation of the disclosed subject matter. The node computing device 207 may receive the notification and the forward stack of identifiers with the unique identifier for the node computing device 207 from the node computing device 100, and may send the notification to its neighbor nodes from which it did not receive the notification, the node computing devices 201 and 205. The node computing device 207 may create separate forward stacks of identifiers, starting with the forward stack of identifiers received from the node computing device 100, with the unique identifiers from the peer table 314 for the node computing devices 201 and 205. The forward stack of identifiers with the unique identifiers for the node computing devices 201 and 207 may be sent to the node computing device 201. The forward stack of identifiers with the unique identifier for the node computing device 205 and 207 may be sent to the node computing device 205.

The node computing device 209 may receive the notification and the forward stack of identifiers with the unique identifier for the node computing device 209 from the node computing device 100, and may send the notification to its neighbor nodes from which it did not receive the notification, the node computing devices 210 and 211. The node computing device 209 may create separate forward stacks of identifiers, starting with the forward stack of identifiers received from the node computing device 100, with the unique identifiers from the peer table 318 for the node computing devices 210 and 211. The forward stack of identifiers with the unique identifiers for the node computing devices 210 and 209 may be sent to the node computing device 210. The forward stack of identifiers with the unique identifiers for the node computing devices 211 and 209 may be sent to the node computing device 211.

Figure 4C:
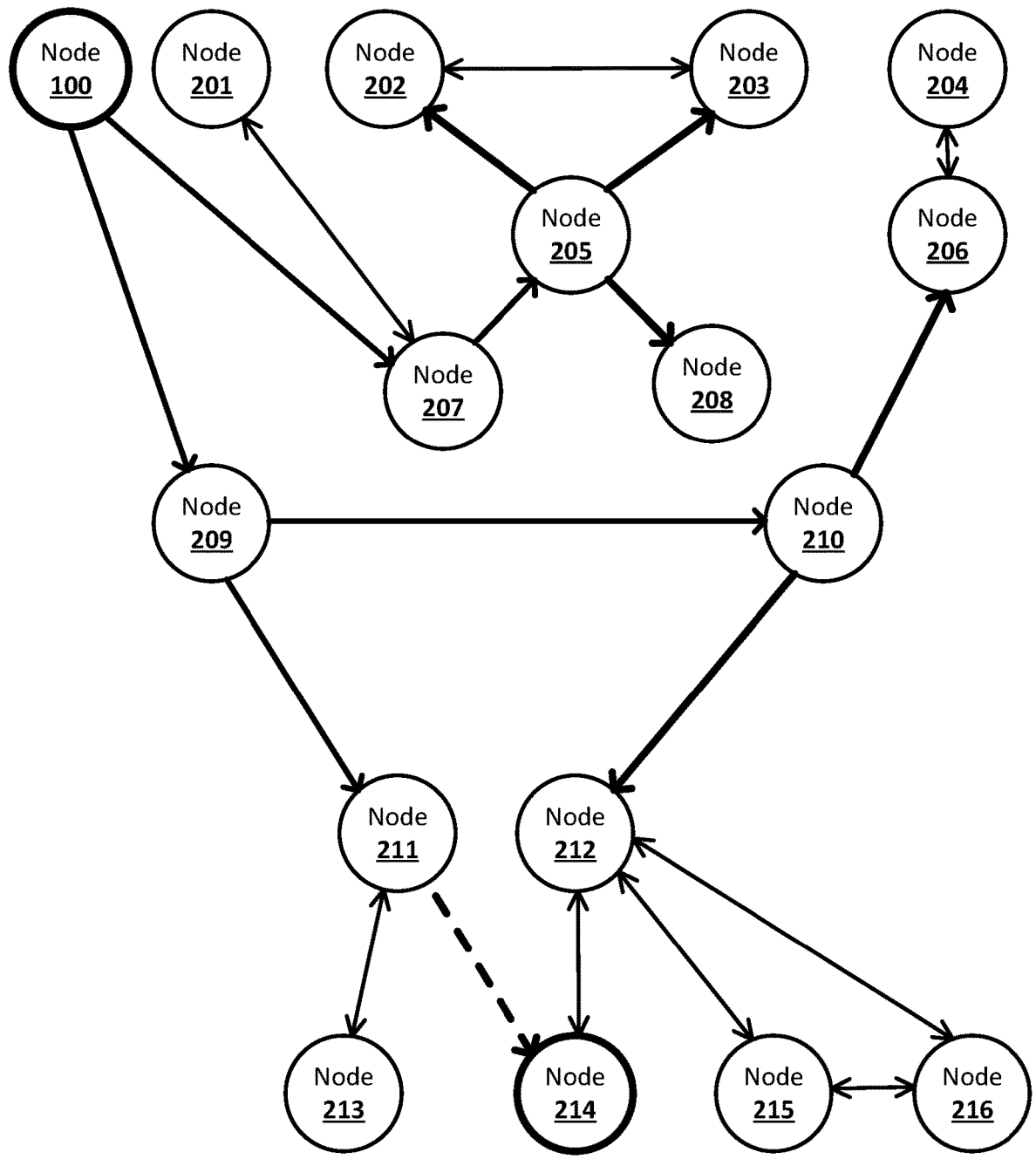
FIG. 4C shows an example system suitable for obscured routing according to an implementation of the disclosed subject matter.

FIG. 4C shows an example system suitable for obscured routing according to an implementation of the disclosed subject matter. The node computing device 201 may receive the notification and the forward stack of identifiers with the unique identifiers for the node computing devices 201 and 207 from the node computing device 207. The peer table 302 in the storage 301 of the node computing device 201 may list the node computing device 207 as the only neighbor node to the node computing device 201. The node computing device 201 may detect a circular route and send a failure message to the node computing device 100, indicating that the route has failed. The forward stack of identifiers may not be returned to the node computing device 100.

The node computing device 205 may receive the notification and the forward stack of identifiers with the unique identifiers for the node computing devices 205 and 207 from the node computing device 207 and may send the notification to its neighbor nodes from which it did not receive the notification, the node computing devices 202, 203, and 208. The node computing device 205 may create separate forward stacks of identifiers, starting with the forward stack of identifiers received from the node computing device 207, with the unique identifiers from the peer table 310 for the node computing devices 202, 203, and 208. The forward stack of identifiers with the unique identifiers for the node computing devices 202, 205, and 207 may be sent to the node computing device 202. The forward stack of identifiers with the unique identifiers for the node computing devices 203, 205, and 207 may be sent to the node computing device 203. The forward stack of identifiers with the unique identifiers for the node computing devices 208, 205, and 207 may be sent to the node computing device 208.

The node computing device 210 may receive the notification and the forward stack of identifiers with the unique identifiers for the node computing devices 210 and 209 from the node computing device 209 and may send the notification to its neighbor nodes from which it did not receive the notification, the node computing devices 206 and 212. The node computing device 210 may create separate forward stacks of identifiers, starting with the forward stack of identifiers received from the node computing device 207, with the unique identifiers from the peer table 320 for the node computing devices 206 and 212. The forward stack of identifiers with the unique identifiers for the node computing devices 206, 210, and 209 may be sent to the node computing device 206. The forward stack of identifiers with the unique identifiers for the node computing devices 212, 210, and 209 may be sent to the node computing device 212.

The node computing device 211 may receive the notification and the forward stack of identifiers with the unique identifiers for the node computing devices 211 and 209 from the node computing device 209. The node computing device 211 may determine, based on the peer table 322, that the destination node, the node computing device 214, is a neighbor node of the node computing device 211. The node computing device 211 may add the unique identifier for the node computing device 214 from the peer table 322 to the forward stack of identifiers received from the node computing device 209. This forward stack of identifiers, including unique identifiers for the node computing devices 214, 211, and 209, may include a complete route from the originator node, the node computing device 100, to the destination node, the node computing device 214. The forward stack of identifiers may be returned to the node computing device 100 through the node computing devices 211 and 209. The node computing device 211 may not need to send the notification to the node computing device 213.

Figure 4D:
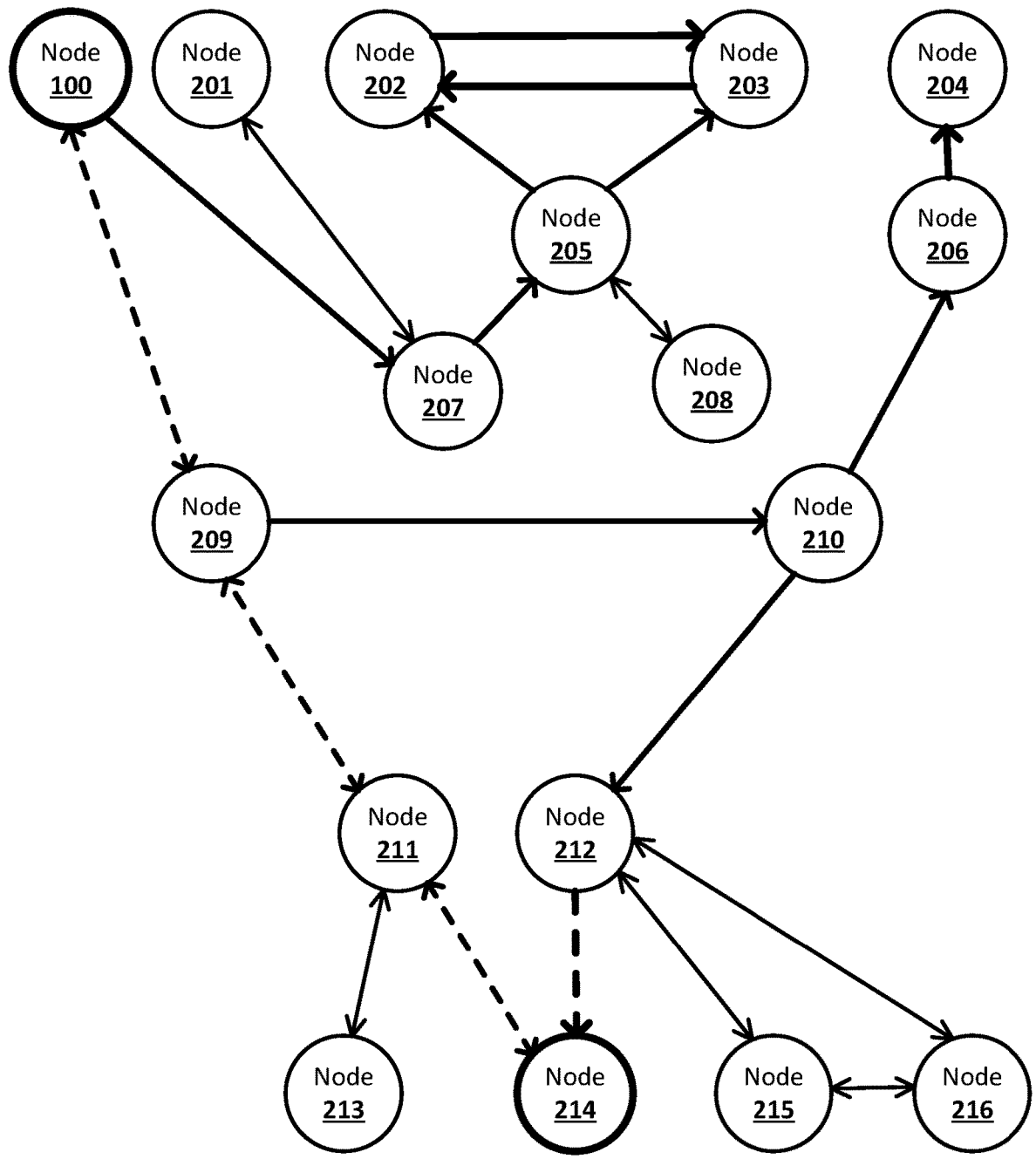
FIG. 4D shows an example system suitable for obscured routing according to an implementation of the disclosed subject matter.

FIG. 4D shows an example system suitable for obscured routing according to an implementation of the disclosed subject matter. The node computing device 202 may receive the notification and the forward stack of identifiers with the unique identifiers for the node computing devices 202, 205 and 207 from the node computing device 205 and may send the notification to its neighbor node from which it did not receive the notification, the node computing device 203. The node computing device 202 may create a forward stack of identifiers, starting with the forward stack of identifiers received from the node computing device 205, with the unique identifiers from the peer table 204 for the node computing device 203. The forward stack of identifiers with the unique identifiers for the node computing devices 203, 202, 205, and 207 may be sent to the node computing device 203.

The node computing device 203 may receive the notification and the forward stack of identifiers with the unique identifiers for the node computing devices 203, 205 and 207 from the node computing device 205 and may send the notification to its neighbor node from which it did not receive the notification, the node computing device 202. The node computing device 203 may create a forward stack of identifiers, starting with the forward stack of identifiers received from the node computing device 205, with the unique identifiers from the peer table 206 for the node computing device 202. The forward stack of identifiers with the unique identifiers for the node computing devices 202, 203, 205, and 207 may be sent to the node computing device 202.

The node computing device 206 may receive the notification and the forward stack of identifiers with the unique identifiers for the node computing devices 206, 210, and 209 from the node computing device 210 and may send the notification to its neighbor node from which it did not receive the notification, the node computing device 204. The node computing device 206 may create a forward stack of identifiers, starting with the forward stack of identifiers received from the node computing device 210, with the unique identifiers from the peer table 312 for the node computing device 204. The forward stack of identifiers with the unique identifiers for the node computing devices 204, 206, 210, and 209 may be sent to the node computing device 204.

The node computing device 208 may receive the notification and the forward stack of identifiers with the unique identifiers for the node computing devices 208, 205, and 207 from the node computing device 205. The peer table 316 in the storage 315 of the node computing device 208 may list the node computing device 205 as the only neighbor node to the node computing device 208. The node computing device 208 may detect a circular route and send a failure message to the node computing device 100, indicating that the route has failed. The forward stack of identifiers may not be returned to the node computing device 100.

The node computing device 212 may receive the notification and the forward stack of identifiers with the unique identifiers for the node computing devices 212, 210, and 209 from the node computing device 210. The node computing device 212 may determine, based on the peer table 324, that the destination node, the node computing device 214, is a neighbor node of the node computing device 212. The node computing device 212 may add the unique identifier for the node computing device 214 from the peer table 324 to the forward stack of identifiers received from the node computing device 210. This forward stack of identifiers, including unique identifiers for the node computing devices 214, 212, 210, and 209, may include a complete route from the originator node, the node computing device 100, to the destination node, the node computing device 214. The forward stack of identifiers may be returned to the node computing device 100 through the node computing devices 212, 210, and 209. The node computing device 212 may not need to send the notification to the node computing devices 215 and 216.

Figure 4E:
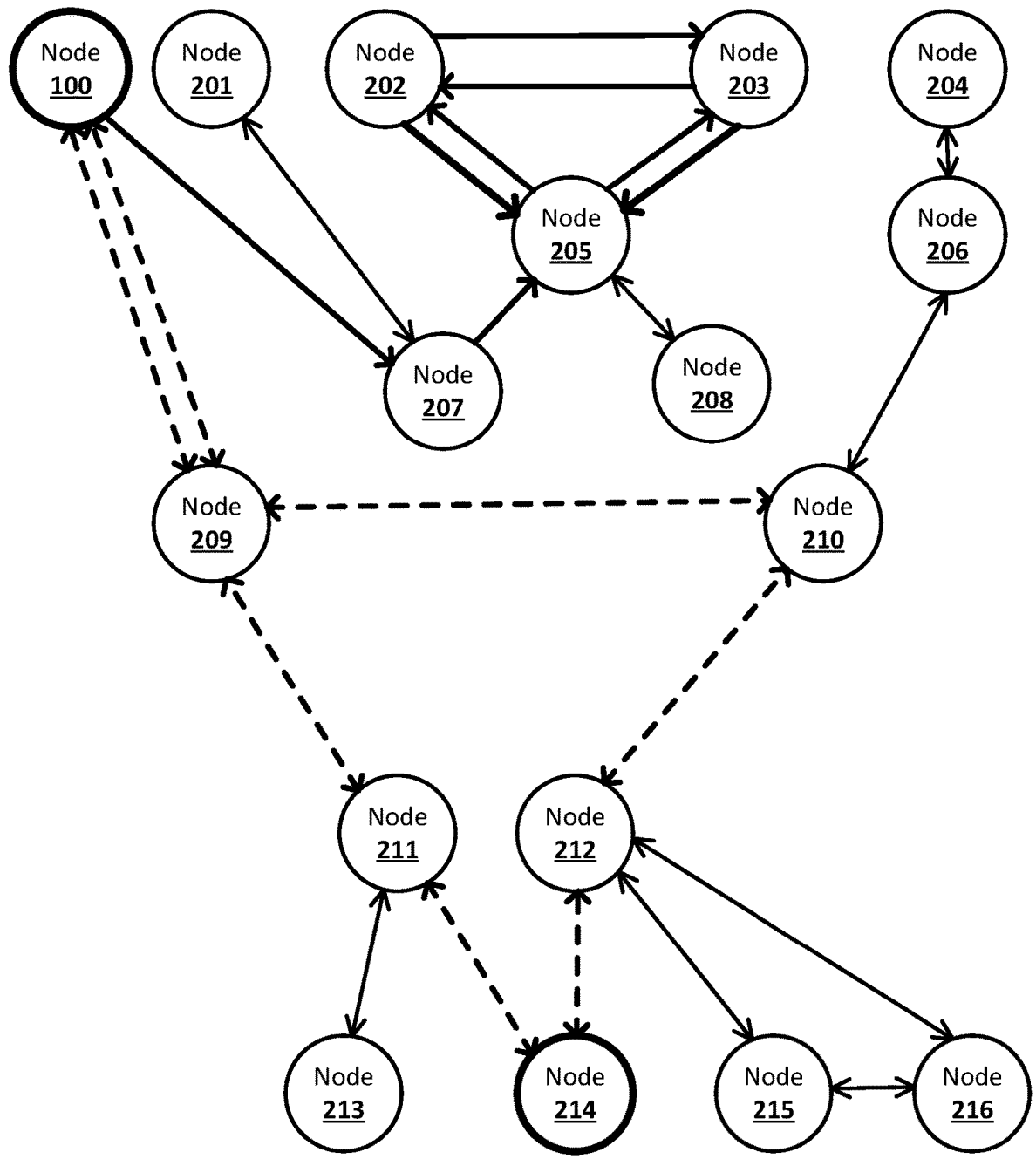
FIG. 4E shows an example system suitable for obscured routing according to an implementation of the disclosed subject matter.

FIG. 4E shows an example system suitable for obscured routing according to an implementation of the disclosed subject matter. The node computing device 202 may receive the notification and the forward stack of identifiers with the unique identifiers for the node computing devices 202, 203, 205 and 207 from the node computing device 203 and may send the notification to its neighbor node from which it did not receive the notification, the node computing device 205. The node computing device 202 may create a forward stack of identifiers, starting with the forward stack of identifiers received from the node computing device 203, with the unique identifiers from the peer table 204 for the node computing device 205. The forward stack of identifiers with the unique identifiers for the node computing devices 205, 202, 203, 205, and 207 may be sent to the node computing device 205.

The node computing device 203 may receive the notification and the forward stack of identifiers with the unique identifiers for the node computing devices 203, 202, 205 and 207 from the node computing device 203 and may send the notification to its neighbor node from which it did not receive the notification, the node computing device 205. The node computing device 203 may create a forward stack of identifiers, starting with the forward stack of identifiers received from the node computing device 202, with the unique identifiers from the peer table 206 for the node computing device 205. The forward stack of identifiers with the unique identifiers for the node computing devices 205, 203, 202, 205, and 207 may be sent to the node computing device 205.

The node computing device 204 may receive the notification and the forward stack of identifiers with the unique identifiers for the node computing devices 204, 206, 210, and 209 from the node computing device 206. The peer table 308 in the storage 307 of the node computing device 204 may list the node computing device 206 as the only neighbor node to the node computing device 204. The node computing device 204 may detect a circular route and send a failure message to the node computing device 100, indicating that the route has failed. The forward stack of identifiers may not be returned to the node computing device 100.

Figure 4F:
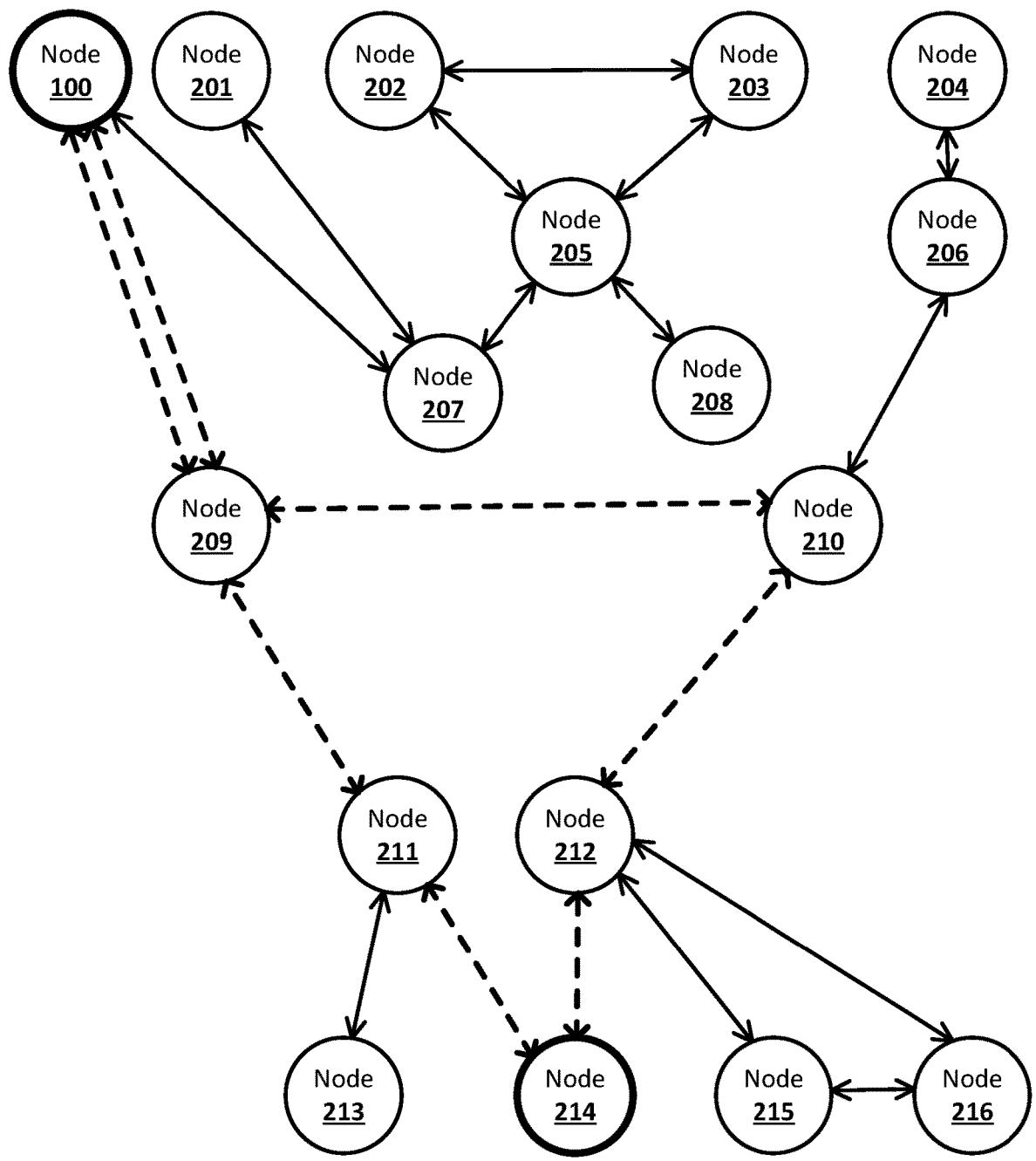
FIG. 4F shows an example system suitable for obscured routing according to an implementation of the disclosed subject matter.

FIG. 4F shows an example system suitable for obscured routing according to an implementation of the disclosed subject matter. The node computing device 205 may receive the notification and the forward stack of identifiers with the unique identifiers for the node computing devices 205, 202, 203, 205 and 207 from the node computing device 202. The node computing device 205 may detect a circular route and send a failure message to the node computing device 100, indicating that the route has failed. The circular route may be based on, for example, an identifier associated with the open connection between the node computing device 205 and the node computing device 203 and included in the forward stack of identifiers or in the notification sent to the node computing device 203. The forward stack of identifiers may not be returned to the node computing device 100.

The node computing device 205 may receive the notification and the forward stack of identifiers with the unique identifiers for the node computing devices 205, 203, 202, 205 and 207 from the node computing device 203. The node computing device 205 may detect a circular route and send a failure message to the node computing device 100, indicating that the route has failed. The circular route may be based on, for example, an identifier associated with the open connection between the node computing device 205 and the node computing device 202 and included in the forward stack of identifiers or in the notification sent to the node computing device 202. The forward stack of identifiers may not be returned to the node computing device 100.

Figure 5A:
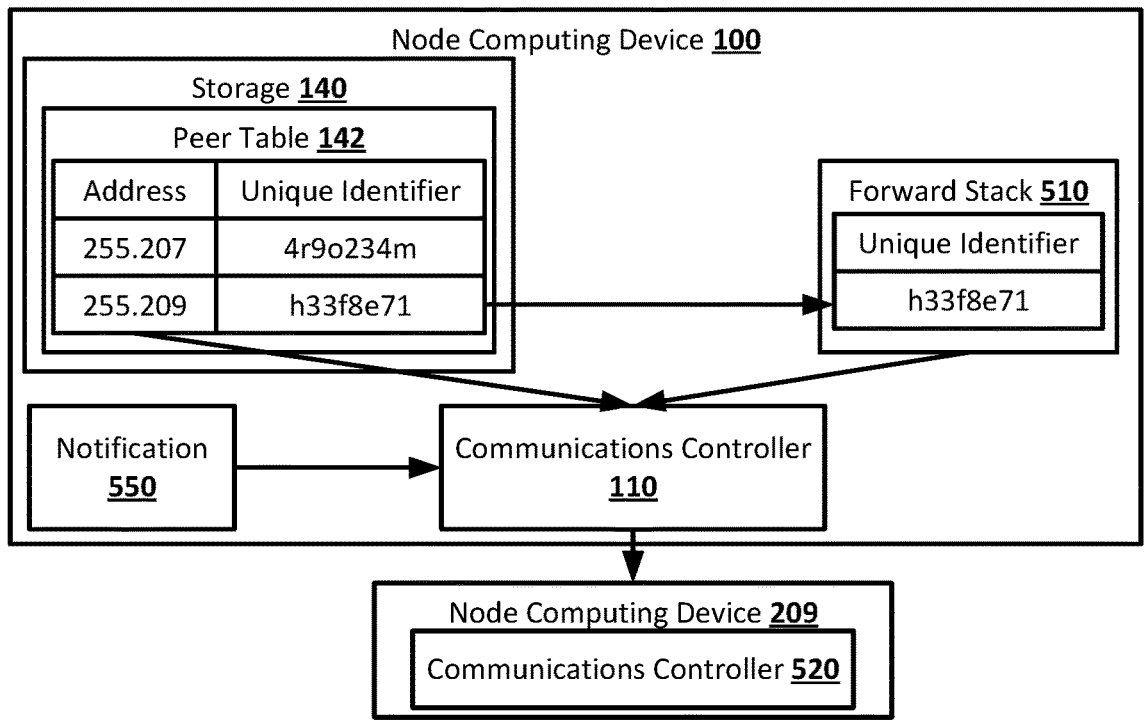
FIG. 5A shows an example arrangement suitable for obscured routing according to an implementation of the disclosed subject matter.

FIG. 5A shows an example arrangement suitable for obscured routing according to an implementation of the disclosed subject matter. A notification 550 may indicate the intent of the node computing device 100 to send a message to the node computing device 214. This may start pathfinding through the network. The node computing device 100, when sending the notification 550 to its neighbor nodes, may also send forward stacks of identifiers to the neighbor nodes. For example, the node computing device 100 may create the forward stack 510 using the unique identifier from the peer table 142 for the node computing device 209. The communications controller 110 of the node computing device 100 may use the address for the node computing device 209 from the peer table 142 to send the forward stack 510 and the notification 550 to the node computing device 209, where it may be received by a communications controller 520 of the node computing device 209.

Figure 5B:
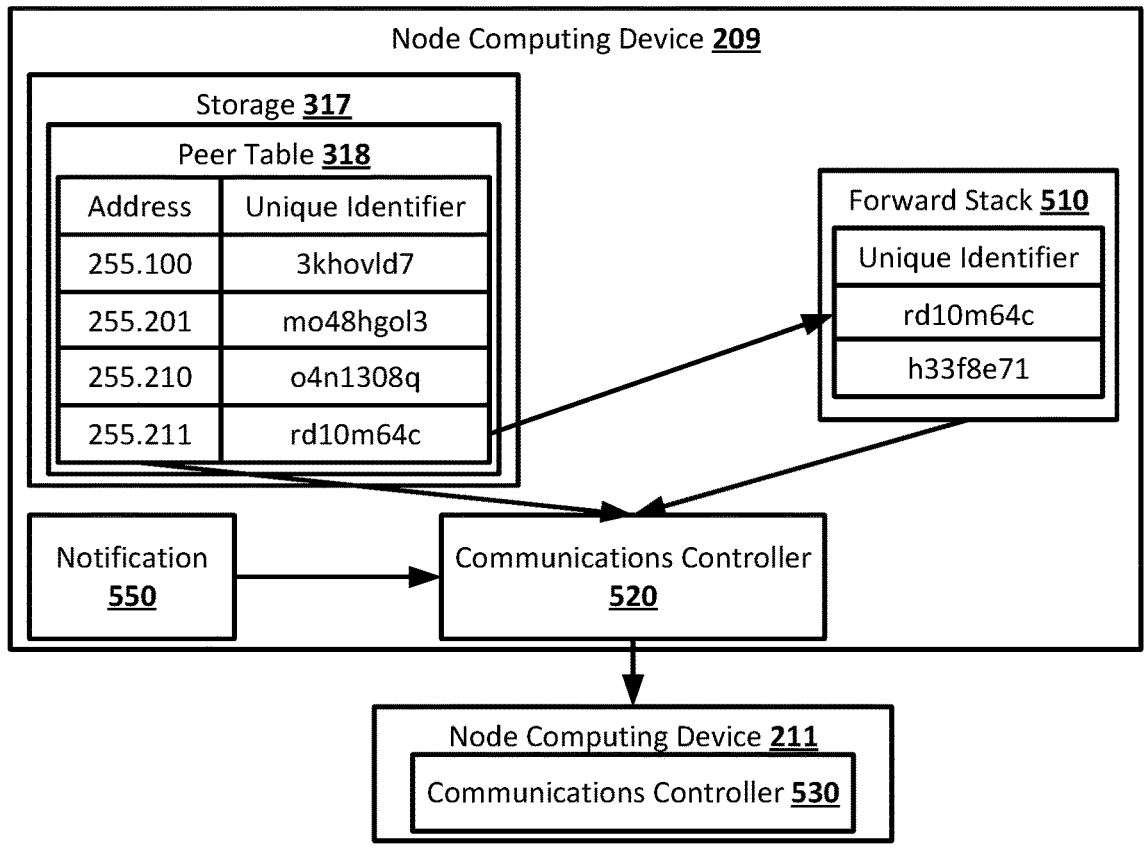
FIG. 5B shows an example arrangement suitable for obscured routing according to an implementation of the disclosed subject matter.

FIG. 5B shows an example arrangement suitable for obscured routing according to an implementation of the disclosed subject matter. The node computing device 209 may receive the notification 550 and determine, based on the peer table 318, that it is not a neighbor node of the destination node, the node computing device 214. The node computing device 209 may send the notification 550 received from the node computing device 100 to its neighbor nodes from which it did not receive the notification, and may also send forward stacks of identifiers to the neighbor nodes. For example, the node computing device 209 may add the unique identifier from the peer table 318 for the node computing device 211 to the forward stack 510. The communications controller 520 of the node computing device 209 may use the address for the node computing device 211 from the peer table 318 to send the forward stack 510 and the notification 550 to the node computing device 211, where it may be received by a communications controller 530 of the node computing device 211.

Figure 5C:
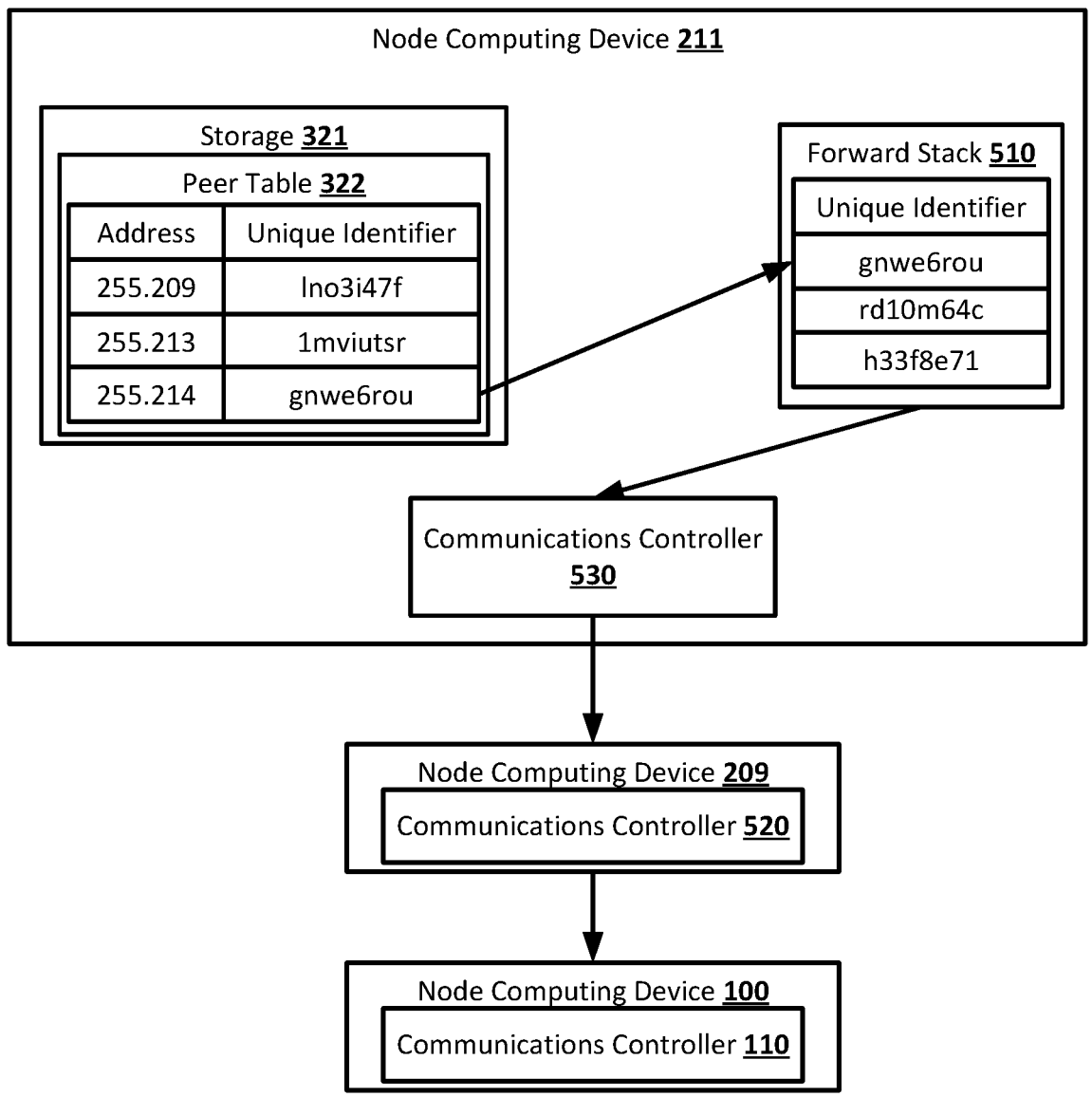
FIG. 5C shows an example arrangement suitable for obscured routing according to an implementation of the disclosed subject matter.

FIG. 5C shows an example arrangement suitable for obscured routing according to an implementation of the disclosed subject matter. The node computing device 211 may receive the notification 550 and determine based on the peer table 322 that it is a neighbor node of the destination node, the node computing device 214. The node computing device 211 may not send the notification 550 to its neighbor nodes from which it did not receive the notification, and may instead complete the route in the forward stack 510. For example, the node computing device 211 may add the unique identifier from the peer table 322 for the node computing device 214 to the forward stack 510. This may result in the forward stack 510 including a complete route from the node computing device 100 to the node computing device 214 using unique identifiers which may only be resolvable to addresses by the node computing devices that added the unique identifiers to the forward stack 510. The node computing device 211 may unable to resolve the other unique identifiers already in the forward stack 510, although it may know that the unique identifier two places in front of the unique identifier added by the node computing device 211 identifies the node computing device 209. The identity of the originator node, the node computing device 100, may remain obscured to the node computing device 211. The communications controller 530 of the node computing device 211 may use an open connection with the node computing device 209 to send the forward stack 510 back to the node computing device 209. The node computing device 209 may use an open connection with the node computing device 100 to send the forward stack 510 back to the node computing device 100.

Figure 6:
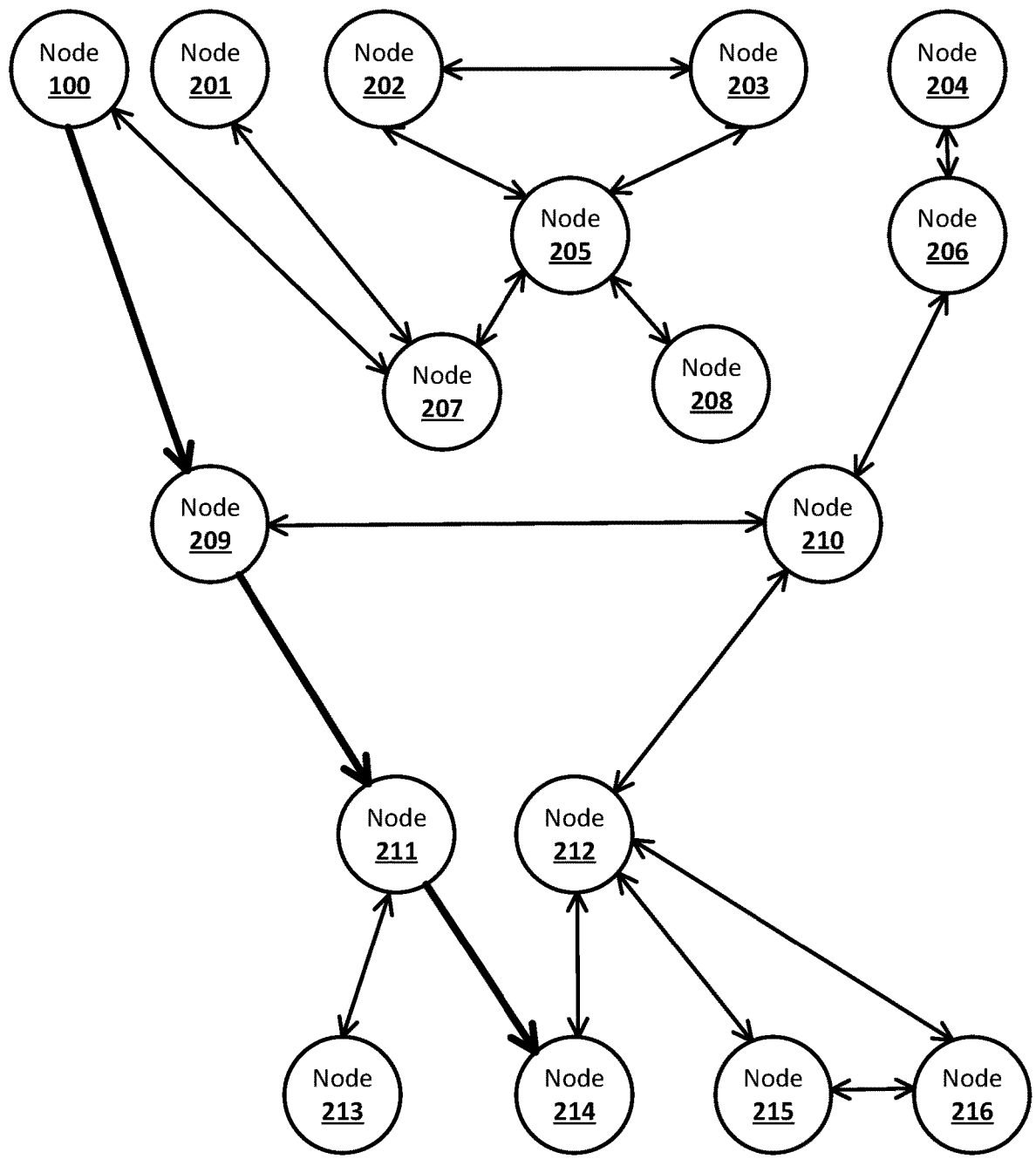
FIG. 6 shows an example system suitable for obscured routing according to an implementation of the disclosed subject matter.

FIG. 6 shows an example system suitable for obscured routing according to an implementation of the disclosed subject matter. The node computing device 100 may receive forward stacks of identifiers with completed routes to the node computing device 214 in response to the notification, for example, the notification 550, sent out by the node computing device 100 to its neighbor nodes. The node computing device 100 may be the originator node and the node computing device 214 may be the destination node. The node computing device 100 may choose a route from a forward stack of identifiers to use to send a message to the node computing device 214. The forward stacks of identifiers may be, for example, the forward stack 510, and a forward stack of identifiers that includes the unique identifiers for the node computing devices 209, 210, 212, and 214.

The node computing device 100 may use the route from the forward stack 510. The message sent by the node computing device 100 may be routed through the node computing device 209 and the node computing device 211 before reaching the destination node, the node computing device 214.

Figure 7A:
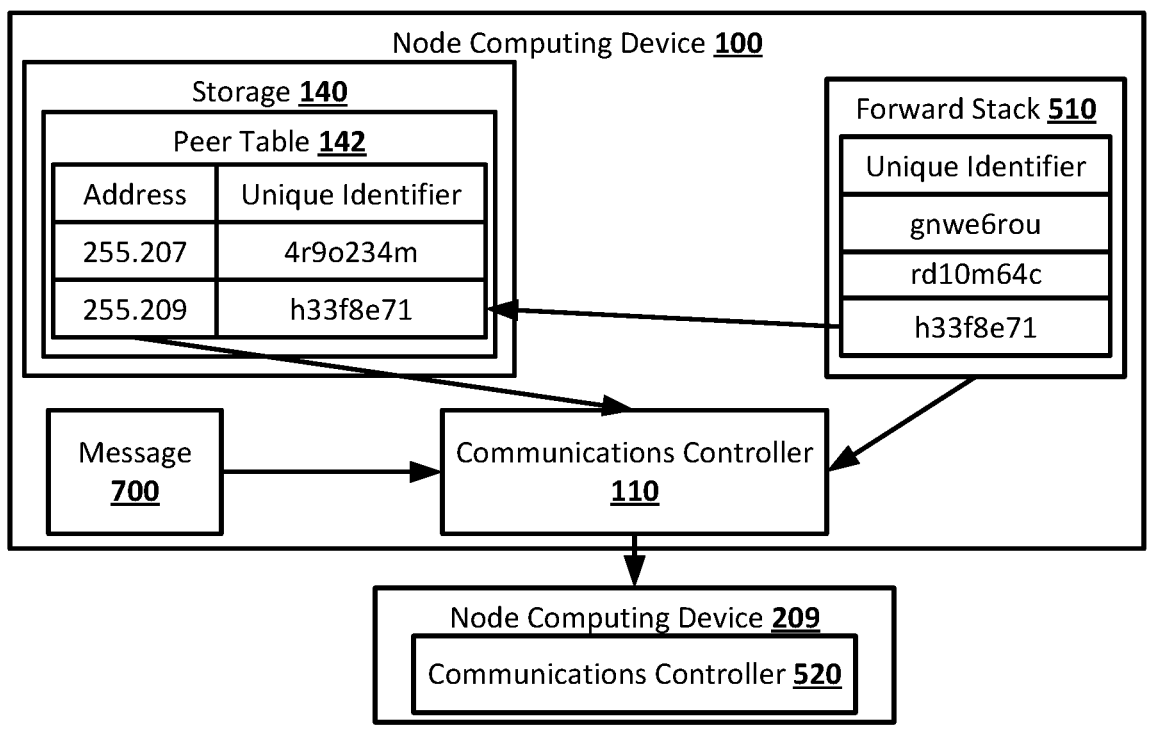
FIG. 7A shows an example arrangement suitable for obscured routing according to an implementation of the disclosed subject matter.

FIG. 7A shows an example arrangement suitable for obscured routing according to an implementation of the disclosed subject matter. The node computing device 100 may use the route in the forward stack 510 to send a message 700 to the node computing device 214. The message 700 may be any suitable data for transmission over a network. The node computing device 100 may read the first unique identifier from the forward stack 510, which may be the unique identifier that was added to the forward stack 510 by the node computing device 100. The first unique identifier may be at the bottom of the forward stack 510, which may be, for example, a first-in-first-out queue. The node computing device 100 may look-up the unique identifier read from the forward stack 510 in the peer table 142. This may resolve the unique identifier to an address that can be used to establish a connection with the next node computing device in the route in the forward stack 510. For example, the unique identifier "h33f8e71" read from the forward stack 510 may be resolved to the address "255.209", which may be the address in the network for the node computing device 209. The unique identifier read from the forward stack 510 may be removed from the forward stack 510, for example, popped off a stack or exited from a queue.

The node computing device 100 may be unable to resolve the remaining unique identifiers in the forward stack 510, as the unique identifiers were not added to the forward stack 510 by the node computing device 100 and are therefore not listed in the peer table 142. However, the node computing device 100 may know that the last unique identifier identifies the node computing device 214 because the node computing device 100 set the node computing device 214 as the destination node. The identity of the third node in the route may be entirely obscured to the node computing device 100. If the route included additional nodes, for example, 6 nodes, the node computing device 100 may still only be able to identify its neighbor node in the route and the destination node in the route, with, for example, the other 3 nodes remaining obscured to the node computing device 100.

The communications controller 110 of the node computing device 100 may use the address for the node computing device 209 to send the forward stack 510 and the message 700 to the node computing device 209, where it may be received by a communications controller 520 of the node computing device 209.

The node computing device 100 may store the forward stack 510 in the cached routes 152. The forward stack 510 may be stored before removing the unique identifier that was read from the forward stack 510.

Figure 7B:
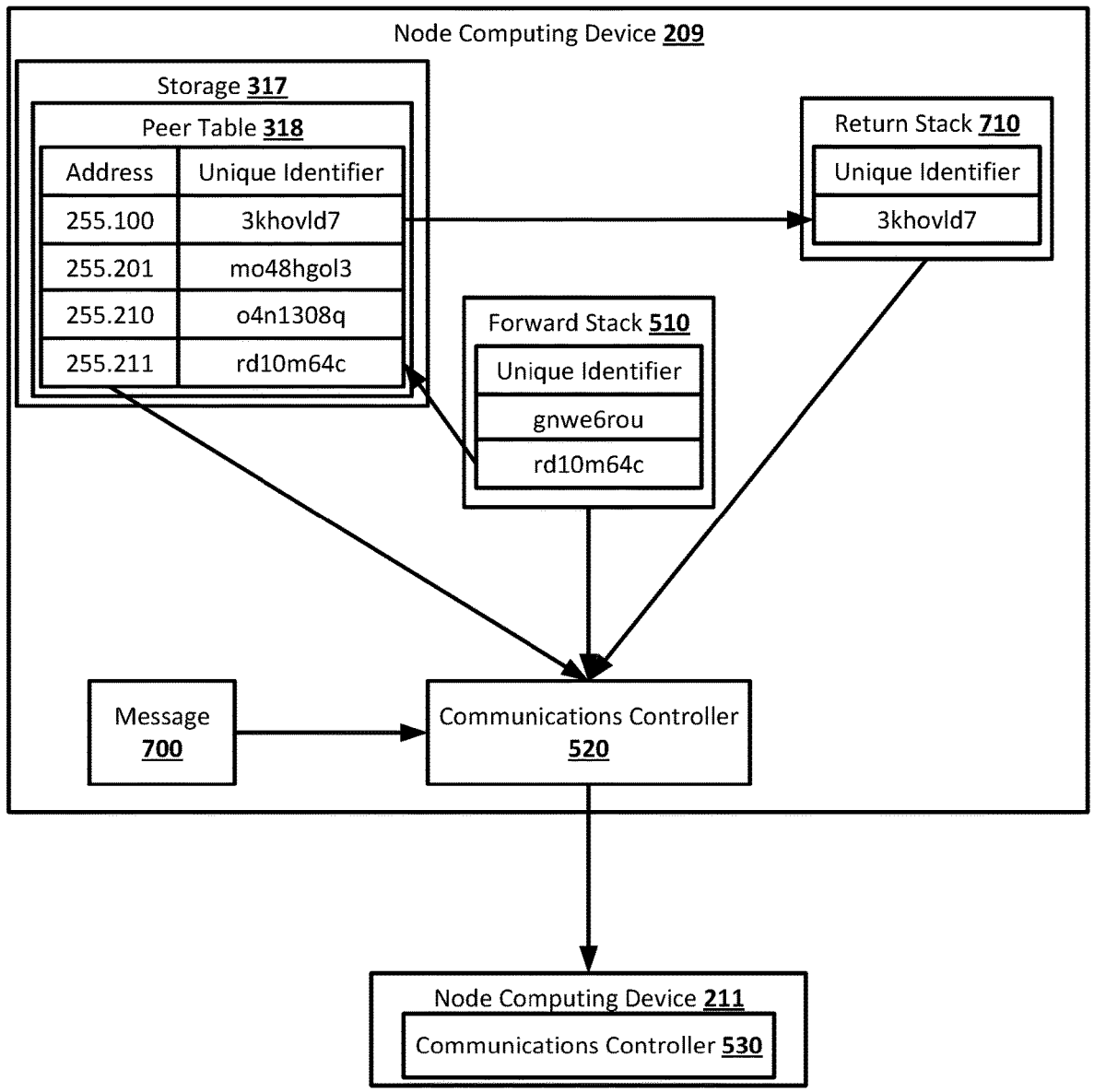
FIG. 7B shows an example arrangement suitable for obscured routing according to an implementation of the disclosed subject matter.

FIG. 7B shows an example arrangement suitable for obscured routing according to an implementation of the disclosed subject matter. The node computing device 209 may use the route in the forward stack 510 to send the message 700, received from the node computing device 100, to the next node in the route in the forward stack 510. The node computing device 209 may read the first unique identifier from the forward stack 510, which may be the unique identifier that was added to the forward stack 510 by the node computing device 209. The first unique identifier may be at the bottom of the forward stack 510, which may be a first-in-first-out queue. The node computing device 209 may look-up the unique identifier read from the forward stack 510 in the peer table 318. This may resolve the unique identifier to an address that can be used to establish a connection with the next node computing device in the route in the forward stack 510. For example, the unique identifier "rd10m64c" read from the forward stack 510 may be resolved to the address "255.211", which may be the address in the network for the node computing device 211. The unique identifier read from the forward stack 510 may be removed from the forward stack 510, for example, popped off a stack or exited from a queue.

The node computing device 209 may be unable to resolve the remaining unique identifier in the forward stack 510, as the unique identifier was not added to the forward stack 510 by the node computing device 100 and are therefore not listed in the peer table 318. The node computing device 209 may know that the remaining unique identifier identifies the node computing device 214 if the node computing device 209 is able to associate the forward stack 510 with the notification 550. Node computing devices that are part of the network may be configured to not store data on notifications so that they may be unable to identify nodes in routes that are not their neighbor nodes. If the route included additional nodes, for example, 6 nodes, the node computing device 209 may only be able to identify its neighbor nodes in the route and possibly the destination node in the route, with, for example, the other 2 nodes remaining obscured to the node computing device 209.

The communications controller 520 of the node computing device 209 may use the address for the node computing device 211 to send the forward stack 510 and the message 700 to the node computing device 211, where it may be received by a communications controller 530 of the node computing device 211.

If asynchronous messaging is being used, the node computing device 209 may create a return stack 710. The return stack 710 may be a return stack of identifiers that may be used by the destination node, the node computing device 214, to send messages back to the node computing device 100. The node computing device 209 may look up the unique identifier for the node from which it received the message 700, the node computing device 100, in the peer table 318. The unique identifier may then be added to the return stack 710. The return stack 710 may be sent to the next node in the route in the forward stack 510, for example, the node computing device 211, along with the message 700 and the forward stack 510.

Figure 7C:
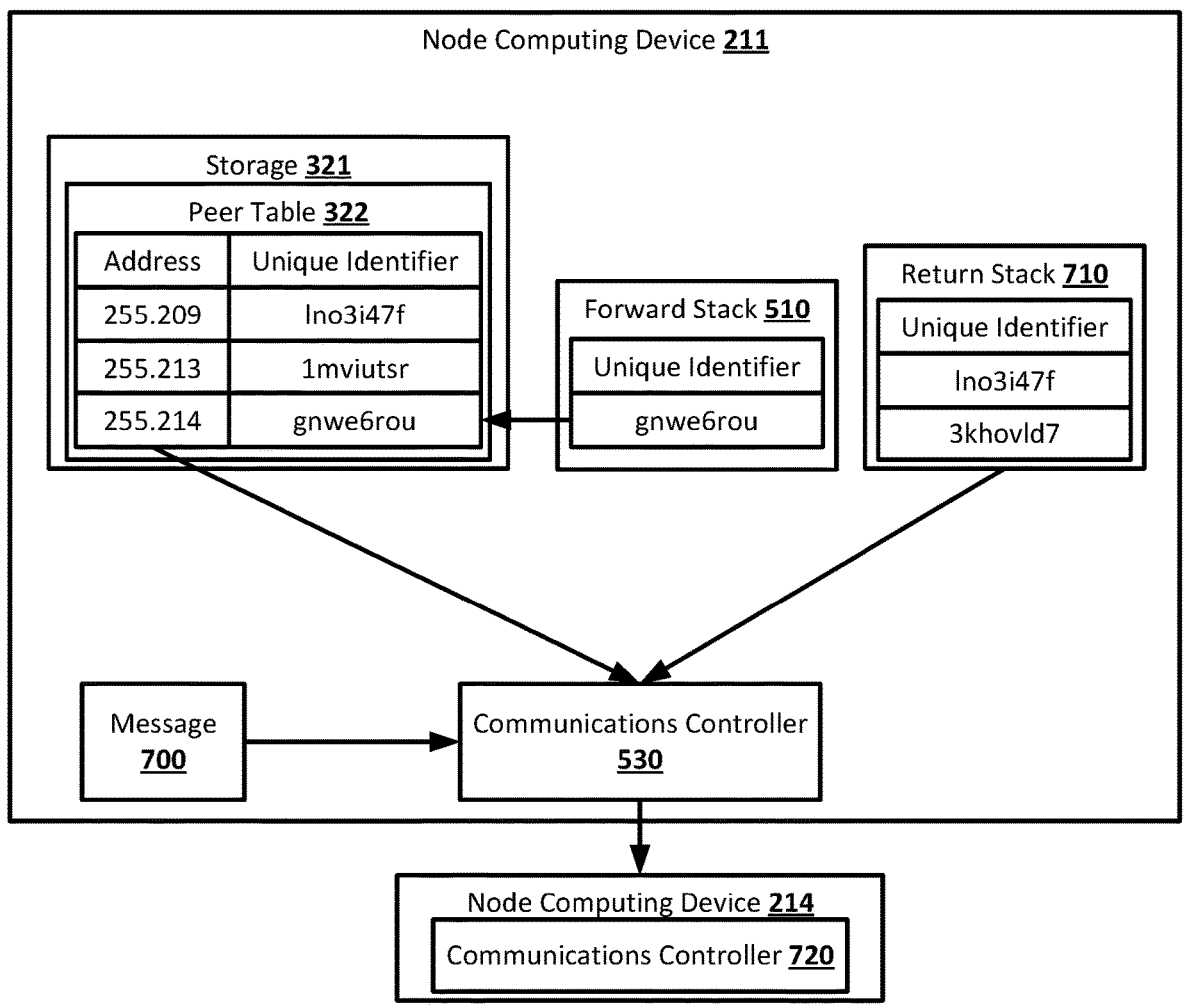
FIG. 7C shows an example arrangement suitable for obscured routing according to an implementation of the disclosed subject matter.

FIG. 7C shows an example arrangement suitable for obscured routing according to an implementation of the disclosed subject matter. The node computing device 211 may use the route in the forward stack 510 to send the message 700, received from the node computing device 209, to the next node in the route in the forward stack 510. The node computing device 211 may read the remaining unique identifier from the forward stack 510, which may be the unique identifier that was added to the forward stack 510 by the node computing device 211. The node computing device 211 may look-up the unique identifier read from the forward stack 510 in the peer table 322. This may resolve the unique identifier to an address that can be used to establish a connection with the next node computing device in the route in the forward stack 510. For example, the unique identifier "gnwe6rou" read from the forward stack 510 may be resolved to the address "255.214", which may be the address in the network for the node computing device 214. The unique identifier read from the forward stack 510 may be removed from the forward stack 510, for example, popped off a stack or exited from a queue.

The node computing device 211 may receive the forward stack 510 with only one unique identifier in it. This may prevent the node computing device 211 from identify any node computing device in the route of the forward stack 510 that is not a neighbor node of the node computing device 211. For example, the node computing device 211 may not be aware that the node computing device 100 is part of the route in the forward stack 510. If the route included additional nodes, for example, 6 nodes, the node computing device 209 may only be able to identify its neighbor nodes in the route, which include the destination node, with, for example, the other 3 nodes remaining obscured to the node computing device 211.

The communications controller 530 of the node computing device 211 may use the address for the node computing device 214 to send the the message 700 to the node computing device 214, where it may be received by a communications controller 720 of the node computing device 214.

If asynchronous messaging is being used, the node computing device 211 may add a unique identifier to the return stack 710. The node computing device 211 may look up the unique identifier for the node from which it received the message 700, the node computing device 209, in the peer table 322. The unique identifier may then be added to the return stack 710. The return stack 710 may be sent to the next node in the route in the forward stack 510, for example, the node computing device 214, along with the message 700.

Figure 7D:
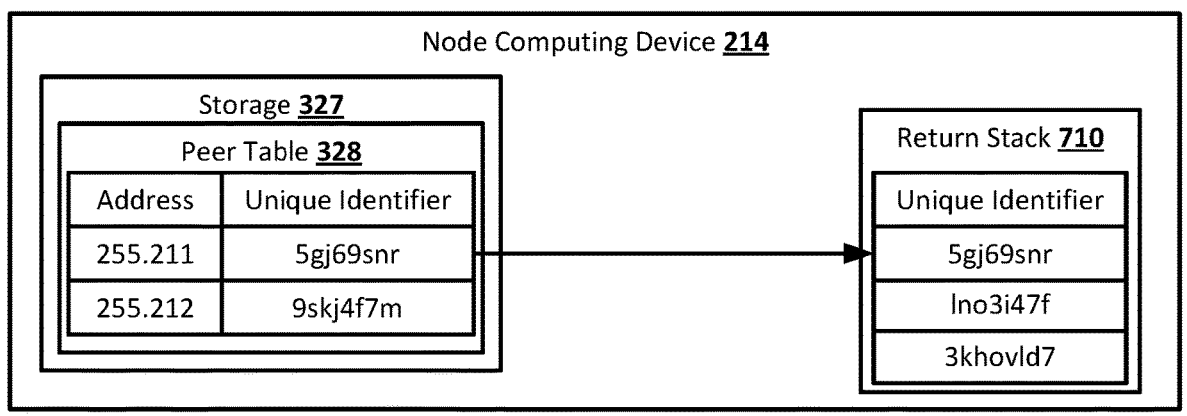
FIG. 7D shows an example arrangement suitable for obscured routing according to an implementation of the disclosed subject matter.

FIG. 7D shows an example arrangement suitable for obscured routing according to an implementation of the disclosed subject matter. The node computing device 214 may receive the message 700. As the destination node, the node computing device 214 may not receive a forward stack of identifiers. All nodes in the route may be obscure to the node computing device 214 except for its neighbor node in the route. In some implementations, the node computing device 214 may be able to identify the node computing device 100 based on data included in the message 700.

If synchronous messaging is used, the node computing device 214 may be able to send a message to the node computing device 211 through an open connection. The node computing device 211 may send this message back to the node computing device 209, which may send the message back to the node computing device 100, through open connections.

If asynchronous messaging is being used, the node computing device 214 may add a unique identifier to the return stack 710. The node computing device 214 may look up the unique identifier for the node from which it received the message 700, the node computing device 211, in the peer table 328. The unique identifier may then be added to the return stack 710. The node computing device 214 may send a message back to the node computing device 100 using the return stack 710. The return stack 710 may be used to send a message to the node computing device 100 in the same manner as the forward stack 510 was used to send the message 700 to the node computing device 214.

Figure 8:
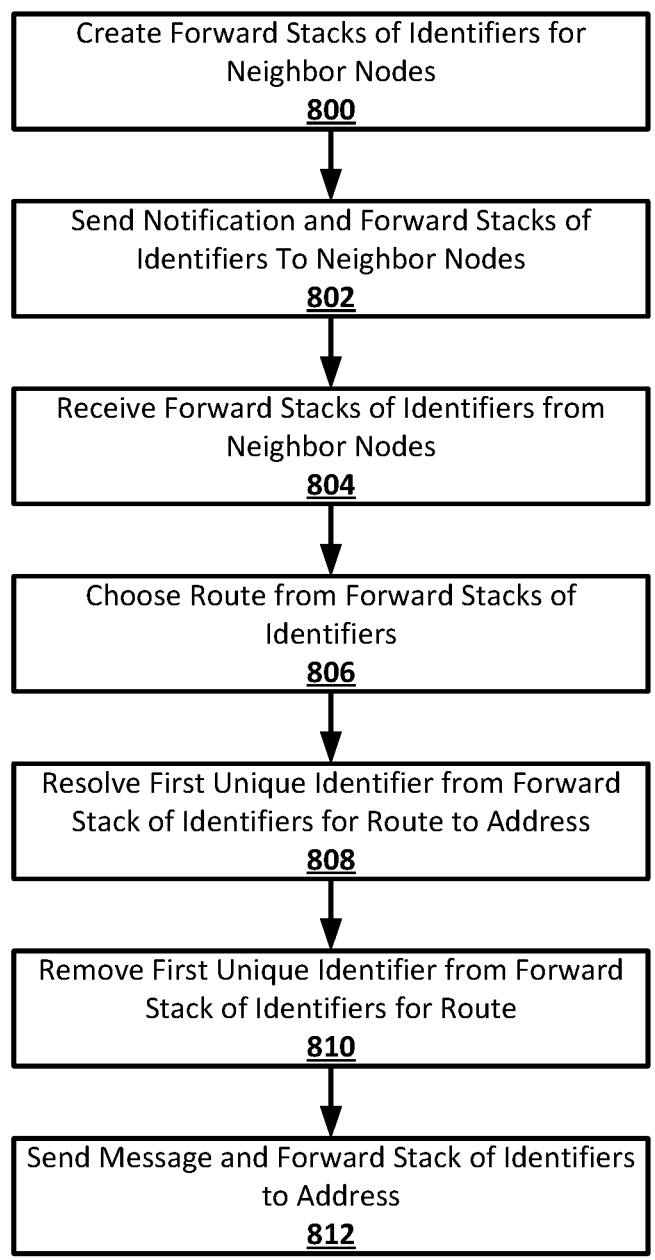
FIG. 8 shows an example procedure suitable for obscured routing according to an implementation of the disclosed subject matter.

FIG. 8 shows an example procedure suitable for obscured routing according to an implementation of the disclosed subject matter. At 800, forward stacks of identifiers may be created. A node computing device that intends to send a message to another node computing device in a network may create forward stacks of identifiers for each of its neighbor nodes. For example, the node computing device 100 may create forward stacks of identifiers for each of the node computing devices 207 and 209 using unique identifiers from the peer table 142.

At 802, notifications and forward stacks of identifiers may be sent to neighbor nodes. The node computing device that intends to send a message to another node computing device in the network may send notification of this intent to each of its neighbor nodes for which it created a forward stack of identifiers, along with the forward stack of identifiers created for that neighbor node. For example, the node computing device 100 may send a notification and a forward stack of identifiers with the unique identifier for the node computing device 207 to the node computing device 207, and may send a notification and a forward stack of identifiers with the unique identifier for the node computing device 209 to the node computing device 209. The notification may include an indication of the destination node for the message the node computing device 100 intends to send.

At 804, forward stacks of identifiers may be received. The node computing device that sent out the notifications may receive forward stacks of identifiers from its neighbor nodes. The forward stacks of identifiers may include routes through the network to the destination node. For example, the node computing device 100 may receive forward stacks of identifiers, such as the forward stack 510, from the node computing devices 207 and 209. The node computing device 100 may receive any number of forward stacks of identifiers, and each forward stack of identifiers may include a complete route to the destination node. The routes may be specified using unique identifiers from peer tables of the node computing devices on the route.

At 806, a route may be chosen from the forward stacks of identifiers. The node computing device that received the forward stacks of identifiers with complete routes may choose a route. For example, the node computing device 100 may choose a route to the destination node from among the forward stacks of identifiers received from the node computing devices 207 and 209. The node computing device 100 may use any suitable criteria to choose a route. For example, the node computing device 100 may choose a route based on which neighbor node of the node computing device 100 the route uses. The node computing device 100 may choose a route based on the number of nodes in the route, as indicated by the number of unique identifiers in the forward stack of identifiers for the route. The node computing device 100 may choose a route based on a cost associated with the route. The cost of a route may be included with a forward stack of identifiers received by the node computing device 100, or the node computing device 100 may send a quote request to the route in a forward stack of identifiers, and may receive the cost of the route in return. The cost may be itemized by each node computing device in the route, or may be a total cost.

At 808, the first unique identifier from the forward stack of identifiers for the chosen route may be resolved to an address. The node computing device that has chosen a route may look up the first unique identifier in the route in its peer table to resolve the unique identifier to an address. For example, the node computing device 100 may look up the first unique identifier in a forward stack of identifiers for the chosen identifiers in the peer table 142, resolving the unique identifier to an address of one of the neighbor nodes of the node computing device 100. For example, the unique identifier may resolve to the address for either node computing device 207 or the node computing device 209.

At 810, the first unique identifier may be removed from the forward stack of identifiers for the route. The node computing device that looked up the first unique identifier and resolved it to an address may remove that unique identifier from the forward stack of identifiers. For example, the node computing device 100 may remove the unique identifier looked up in the peer table 142 from the forward stack of identifiers for the chosen route, for example, the forward stack 510. The unique identifier that is removed from the forward stack of identifiers may be the unique identifier that identifiers that next node computing device in the route.

At 812, the message and forward stack of identifiers may be sent to the address. The node computing device that looked up the first unique identifier and resolved it to an address may remove that unique identifier from the forward stack of identifiers. For example, the node computing device 100 may send the message, such as the message 700, to the node computing device at the address that the looked up unique identifier from the forward stack of identifiers was resolved to. The node computing device at the address may be, for example, the node computing device 207 or 209. The forward stack of identifiers, for example, the forward stack 510, with the looked up unique identifier removed, may be sent to the node computing device at the address along with message.

Figure 9:
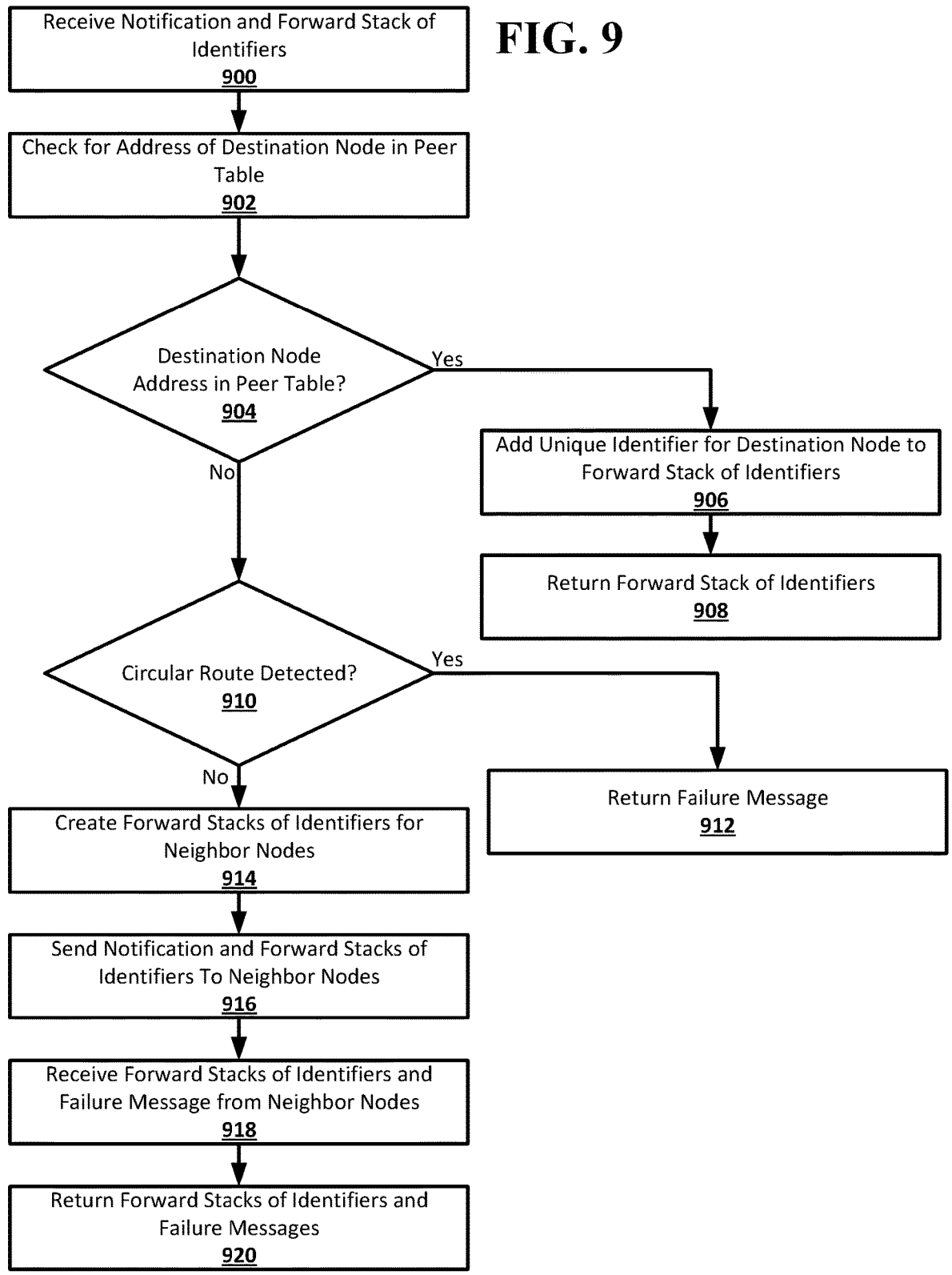
FIG. 9 shows an example procedure suitable for obscured routing according to an implementation of the disclosed subject matter.

FIG. 9 shows an example procedure suitable for obscured routing according to an implementation of the disclosed subject matter. At 900, a notification and forward stack of identifiers may be received. A node computing device may receive a notification and a forward stack of identifiers from one of its neighbor nodes in the network. For example, the node computing device 211 may receive a notification and a forward stack of identifiers from the node computing device 209. The notification may include an indication of the destination node for the message the node computing device that originally sent out the notification intends to send. The forward stack of identifiers may include unique identifiers for the node computing device 209 and for other node computing devices that the notification passed through before being received by the node computing device 209.

At 902, a peer table may be checked for the address of a destination node. A node computing device the receives a notification may check its peer table for the address of the destination node indicated in the notification. For example, the notification received by the node computing device 211 may indicate the node computing device 214 is the destination node. The node computing device 211 may check the peer table 322 to determine whether it includes the address for the node computing device 214.

At 904, if the address for the destination node is found in the peer table, flow may proceed to 906. Otherwise, flow may proceed to 910. If the address for the destination node included in a notification is found in the peer table of a node computing device that received the notification, that node computing device may be neighbor to the destination node. If the address for the destination node included in a notification is not found in the peer table of a node computing device that received the notification, that node computing device may not be a neighbor to the destination node.

At 906, a unique identifier for the destination node may be added to the forward stack of identifiers. A node computing device that finds the address for a destination node from a received notification in its peer table may be a neighbor to the destination node, and may be able to complete the route in the forward stack of identifiers by adding the unique identifier for the destination node from its peer table. For example, the node computing device 211 may determine that the peer table 322 includes the address for the destination node, the node computing device 214, indicated in the notification received by the node computing device 211 from the node computing device 209. The node computing device 211 may add the unique identifier for the node computing device 214 from the peer table 322 to the forward stack of identifiers. This may complete the route in the forward stack of identifiers from the originator node to the destination node.

At 908, a forward stack of identifiers may be returned. A node computing device that has added a unique identifier for the destination node to a forward stack of identifiers may return the forward stack of identifiers to the node computing device from which the notification and forward stack of identifiers was received. For example, the node computing device 211 may return the forward stack of identifiers to the node computing device 209, from which the node computing device 211 received the notification and forward stack of identifiers. The forward stack of identifiers may be returned over an open connection established between the node computing device 209 and the node computing device 211 when the node computing device 209 sent the notification and forward stack of identifiers to the node computing device 211.

At 910, if a circular route is detected, flow may proceed to 912. Otherwise, flow may proceed to 914. A node computing device that receives a notification and determines that it is not a neighbor of the destination node indicated in the notification may check for a circular route. A circular route may be detected when, for example, the node computing device determines that the only neighbor node computing device the node computing device could send the notification and stack of forward identifiers to is the neighbor node computing device from which the node computing device just received the notification and stack of identifiers. A circular route may also be detected when, for example, the node computing device determines that it has already received the notification and forward stack of identifiers, and added a unique identifier to the forward stack of identifiers, previously.

At 912, a failure message may be returned. A node computing device that detects a circular route may determine that the route in the in the forward stack of identifiers has failed, and may return a failure message to the node computing device from which it received the notification and forward stack of identifiers. For example, the node computing device 201, on receiving a notification and forward stack of identifiers from the node computing device 207, may detect a circular route due to the node computing device 207 being the only neighbor node to which the node computing device 201 could send the notification and forward stack of identifiers. The node computing device 201 may return a failure message to the node computing device 207.

At 914, forward stacks of identifiers may be created for neighbor nodes. A node computing device that is not a neighbor node of the destination node may create forward stacks of identifiers for its neighbor nodes by adding unique identifiers for its neighbor nodes to the received forward stack of identifiers. For example, the node computing device 210, on receiving a notification and forward stack of identifiers from the node computing device 209, may determine that is not a neighbor node of the destination indicated in the notification. The node computing device 210 may use the forward stack of identifiers to create forward stacks of identifiers to send to the neighbor node from which it did not receive the notification, the node computing devices 206 and 212. The node computing device 210 may look-up the unique identifier for the node computing device 206 in the peer table 320 and add that unique identifier to the received forward stack of identifiers to create a forward stack of identifiers to be sent to the node computing device 206. The node computing device 210 may look-up the unique identifier for the node computing device 212 in the peer table 320 and add that unique identifier to the received forward stack of identifiers to create a forward stack of identifiers to be sent to the node computing device 212. The forward stacks of identifiers may be separate, and each may have only one unique identifier added to it by the node computing device 210.

At 916, the notification and forward stacks of identifiers may be sent to neighbor nodes. A node computing device which has created forward stacks of identifiers for its neighbor nodes may send those forward stacks of identifiers, and the received notification, to the neighbor nodes. For example, the node computing device 210 may send the notification received from the node computing device 209 and the forward stack of identifiers to which it added the unique identifier for the node computing device 206 to the node computing device 206. The node computing device may also send the notification received from the node computing device 209 and the forward stack of identifiers to which it added the unique identifier for the node computing device 212 to the node computing device 212.

At 918, forward stacks of identifiers and failure messages may be received. A node computing device may maintain an open connection with the neighbor nodes to which it sent the notification and forward stacks of identifiers, and may receive forward stacks of identifiers or failure messages from each of those neighbor nodes. For example, the node computing device 210 may receive a forward stack of identifiers from the node computing device 212 through the open connection that was used by the node computing device 210 to send the notification and forward stack of identifiers to the node computing device 212. This may indicate that the forward stack of identifiers returned by the node computing device 212 includes a complete route to the destination node. The node computing device 210 may receive a failure message from the node computing device 206. This may indicate that a circular route was detected, or a maximum number of nodes was reached, either at or beyond the node computing device 206.

At 920, forward stacks of identifiers and failure messages may be returned. A node computing device that receives a forward stack of identifiers returned through an open connection may return that forward stack of identifiers to the neighbor node computing device from which it was received. A node computing device that receives a failure message may return the failure message to the neighbor node computing device from which the forward stack of identifiers that included the route that has now failed was received. For example, the node computing device 210 may return both the forward stack of identifiers returned by the node computing device 212 and the failure message returned by the node computing device 206 to the node computing device 209.

FIG. 10A shows an example procedure suitable for obscured routing according to an implementation of the disclosed subject matter. At 1000, a message may be received. A node computing device may receive a message that is being sent through a network. For example, the node computing device 211 may receive the message 700 from the node computing device 209.

At 1002, if a forward stack of identifiers is received, flow may proceed 1004. Otherwise, flow may proceed to 1014. For example, if a node computing device that receives a message also receives a forward stack of identifiers, that node computing may not be the destination node for the message and may proceed to pass the message to the next node computing device in the route as indicated in the forward stack of identifiers. If a node computing device does not receive a forward stack of identifiers along with a message, the node computing device may be the destination node for the message.

At 1004, a first unique identifier may be resolved to an address using a peer table. A node computing device that receives a message and a forward stack of identifiers may determine which node computing device to send the message to by looking up the first unique identifier in the forward stack of identifiers in its peer table to obtain an address. For example, the node computing device 211 may look up the unique identifier "gnwe6rou" from the forward stack 510 in the peer table 322. The unique identifier may resolve to the address 255.214, which may be the address of the node computing device 214. The unique identifier looked up by a node computing device from a forward stack of identifiers may be a unique identifier that was previously added to that forward stack of identifiers by the node computing device.

At 1006, the first unique identifier may be removed from the forward stack of identifiers. After a node computing device resolves the first unique identifier from a forward stack of identifiers to an address, the node computing device may remove the first unique identifier from the forward stack of identifiers. For example, the node computing device 211, after looking up the unique identifier "gnwe6rou" from the forward stack 510 in the peer table 322, may remove the unique identifier "gnwe6rou" from the forward stack 510.

At 1008, if the forward stack of identifiers is empty, flow may proceed to 1012. Otherwise, flow may proceed to 1010. If the forward stack of identifiers is empty after the node computing device removes the looked-up unique identifier, the address the looked-up unique identifier resolved to may be the destination node for the message. Otherwise, the next node computing device in the route may need the forward stack of identifiers to determine where it should send the message.

At 1010, the forward stack of identifiers may be sent to the address. The node computing device may send the forward stack of identifiers, having removed the looked-up unique identifier, to the address that the looked-up unique identifier resolved to. For example, the node computing device 209 may send the forward stack 510 to the node computing device 211 after removing the unique identifier that the node computing device 209 resolved to the address of the node computing device 211 using the peer table 318.

At 1012, the message may be sent to the address. A node computing device that is not the destination node for a message may send the message to the address of the next node computing device in the route as determined by looking up the first unique identifier in the peer table. For example, the node computing device 209 may send the message 700 to the node computing device 211. As another example, the node computing device 211 may send the message 700 to the node computing device 214 while not sending the forward stack 510, which may now be empty, indicating that the node computing device 214 is the destination node. The message may be passed in unaltered form between nodes, or nodes may make changes to the message. For example, a message received by a node computing device may cause that node computing device to perform some operation. The node computing device may then alter the message to include proof that the operation was performed. The node computing device may also alter the message to include instructions for an operation to be performed by the next node computing device that receives the message, in accordance with instructions or rules already included in the message.

At 1014, a reply to a received message may be sent. A node computing device that receives a message and no forward stack of identifiers may be the destination node for the message, and may choose to reply to the message over an open connection to the node computing device that sent the message. The reply may be passed back the node computing device that was the originator node for the message through open connections between neighbor nodes on the route from the originator node to the destination node. Replying to a received message may be optional for the destination node.

Figure 10B:
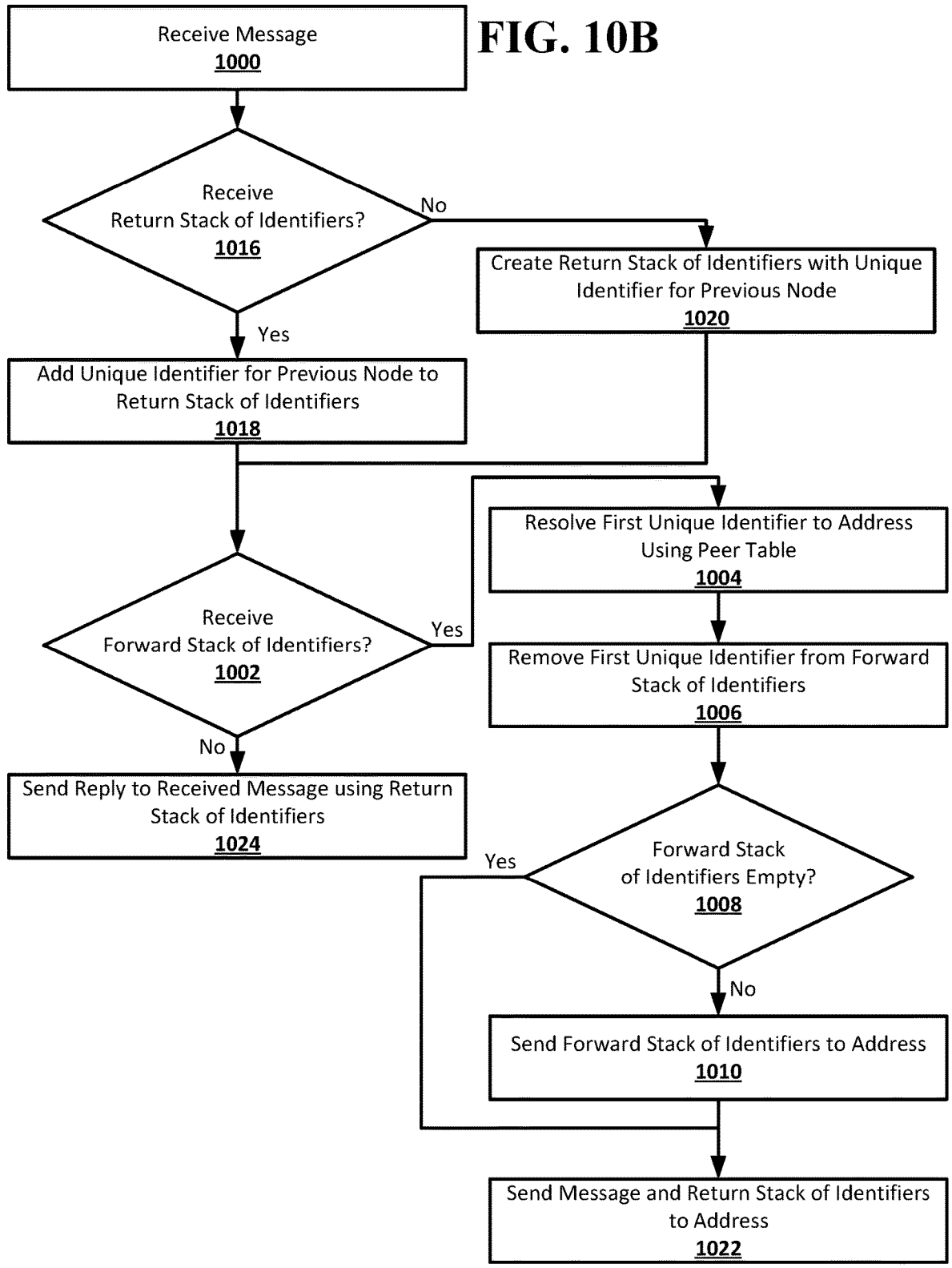
FIG. 10B shows an example procedure suitable for obscured routing according to an implementation of the disclosed subject matter.

FIG. 10B shows an example procedure suitable for obscured routing according to an implementation of the disclosed subject matter. At 1016, if a return stack is received, flow may proceed to 1018, otherwise flow may proceed to 1020. A node computing device may receive a return stack of identifiers along with a message received at 1000 when a network uses asynchronous messaging. For example, the node computing device 211 may receive the return stack 710 from the node computing device 209 along with the message 700 when the network uses asynchronous messaging.

At 1018, a unique identifier for a previous node may be added to the return stack of identifiers. A node computing device that receives a return stack of identifiers may look up in its peer table the previous node computing device in the route from which the return stack of identifiers was received. For example, the node computing device 211, after receiving the return stack 710 from the node computing device 209, may look up the unique identifier for the node computing device 209 in the peer table 322. The unique identifier for the node computing device 209 may be added to the return stack 710.

At 1020, a return stack of identifiers may be created using a unique identifier for a previous node. If a node computing device in a network that uses asynchronous messaging receives a message and a forward stack of identifiers with no return stack of identifiers, the node computing device may need to create the return stack of identifiers using the unique identifier for the previous node from which it received the message and forward stack of identifiers. The previous node may be the originator node for the message. For example, the node computing device 209 may receive the message 700 and the forward stack 510 from the node computing device 100, but may not receive a return stack of identifiers. The node computing device 209 may create the return stack of identifiers by looking up the unique identifier for the node computing device 100 in the peer table 318 and adding the unique identifier as the first unique identifier in the return stack 710.

At 1022, the message and the return stack of identifiers may be sent to an address. A node computing device that received a forward stack of identifiers may, after resolving the first unique identifier in the forward stack of identifiers to an address and removing that first unique identifier from the forward stack of identifiers, send both the message and the return stack of identifiers to the address, which may be for the next node computing device in the route. For example, the node computing device 211, after resolving the unique identifier "gnwe6rou" from the forward stack 510 to the address 255.214 using the peer table 322, may remove the unique identifier "gnwe6rou" from the forward stack 510 and send the message 700 and the return stack 710 to the node computing device 214.

At 1024, a reply to a received message may be sent using the return stack of identifiers. A node computing device that receives a message and no forward stack of identifiers may be the destination node for the message, and may choose to reply to the message using a return stack of identifiers. The return stack of identifiers may be used by the destination node in the same manner that the forward stack of identifiers was used by the originator node. The return stack of identifiers may include a route from the destination node back to the originator node, reversing the route the message travelled from the originator node to the destination node. Replying to a received message may be optional for the destination node.

Figure 11:
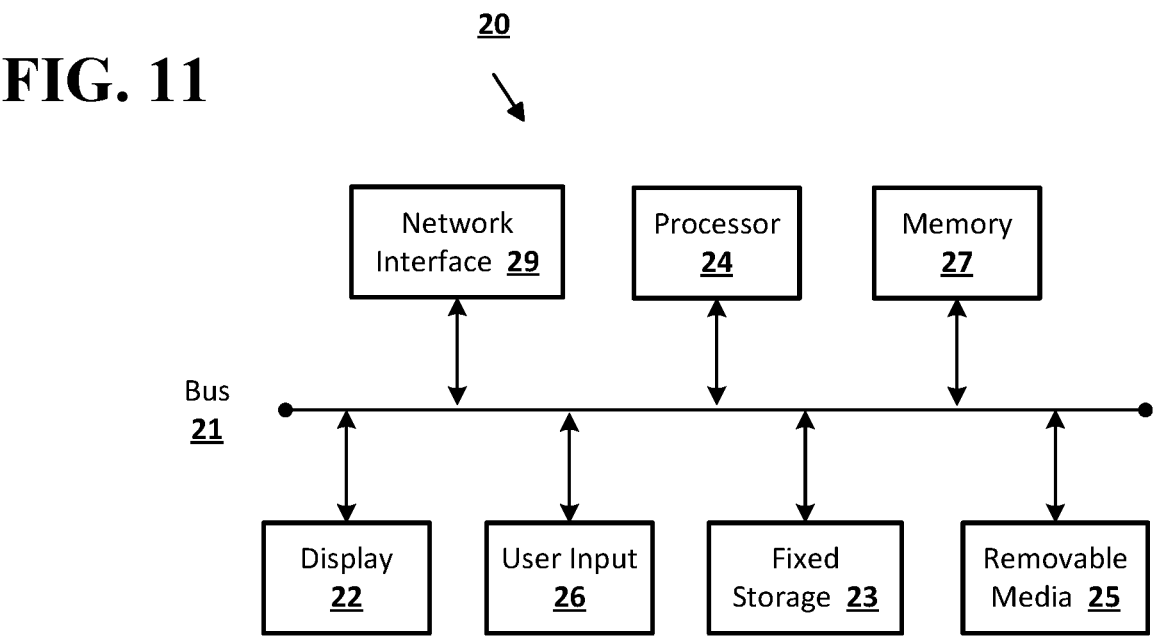
FIG. 11 shows a computer according to an embodiment of the disclosed subject matter.

Implementations of the presently disclosed subject matter may be implemented in and used with a variety of component and network architectures. FIG. 11 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 12.

Many other devices or components (not shown) may be connected in a similar manner (e.g., document scanners, digital cameras, and so on). Conversely, all of the components shown in FIG. 11 need not be present to practice the present disclosure. The components can be interconnected in different ways from that shown. The operation of a computer such as that shown in FIG. 11 is readily known in the art and is not discussed in detail in this application. Code to implement the present disclosure can be stored in computer-readable storage media such as one or more of the memory 27, fixed storage 23, removable media 25, or on a remote storage location.

Figure 12:
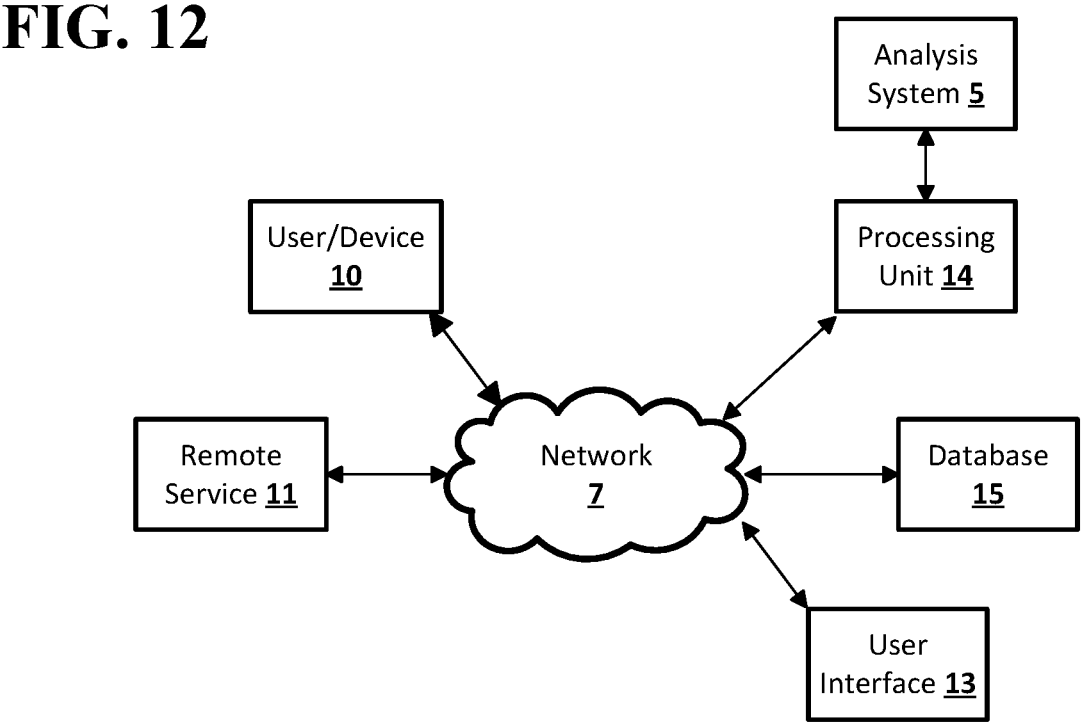
FIG. 12 shows a network configuration according to an embodiment of the disclosed subject matter.

FIG. 12 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
sending, by a first node computing device, a separate forward stack of identifiers to each of one or more neighbor node computing devices of the first node computing device in a network, wherein each separate forward stack of identifiers comprises a unique identifier for the neighbor node computing device to which the forward stack of identifiers is sent;
sending, by the first node computing device to each of the one or more neighbor node computing devices along with the forward stacks of identifiers, a notification comprising an indication of a destination node computing device in the network;
receiving, by the first node computing device, forward stacks of identifiers from at least one of the one or more neighbor node computing devices, each of the received forward stacks of identifiers comprising a completed route to the destination node computing device, wherein each completed route is specified by unique identifiers added to the forward stack of identifiers by one or more node computing devices in the network, and wherein at least one unique identifier in each of the forward stacks of identifiers is not resolvable to an address by the first node computing device; and sending, by the first node computing device, a message to one of the one or more neighbor node computing devices based on a first unique identifier in a chosen one of the received forward stacks of identifiers, wherein the first unique identifier in the chosen one of the received forward stacks of identifiers was added to the chosen one of the received forward stacks of identifiers by the first node computing device before the sending, by the first node computing device, of the separate forward stack of identifiers to each of the one or more neighbor node computing devices of the first node computing device.

2. The computer-implemented method of claim 1, wherein sending the message to the one of the one or more neighbor node computing devices based on the first unique identifier in the chosen one of the received forward stacks of identifiers further comprises resolving, by the first node computing device, a first unique identifier from the chosen one of the received forward stacks of identifiers to an address in the network of the one of the one or more neighbor nodes.

3. The computer-implemented method of 2, wherein the resolving uses a peer table of the first node computing device, wherein the peer table comprises one or more unique identifiers, each of the one or more unique identifiers associated with an address in the network of a neighbor node computing device of the first node computing device.

4. The computer-implemented method of claim 2, further comprising, after resolving the first unique identifier, removing the first unique identifier from the chosen one of the received forward stacks of identifiers.

5. The computer-implemented method of claim 1, further comprising sending the chosen one of the received forward stacks of identifiers to the one of the one or more neighbor node computing devices.

6. A computer-implemented method comprising:
receiving, at a node computing device in a network, from another node computing device in the network, a notification comprising an indication of a destination node computing device and a forward stack of identifiers comprising one or more unique identifiers, wherein each unique identifier in the forward stack of identifiers is resolvable to an address using a peer table of a node computing device that added the unique identifier to the forward stack of identifiers and is not resolvable to an address using the peer table of any other node computing device in the network;
if the node computing device is a neighbor of the destination node computing device:
adding a unique identifier for the destination node computing device from a peer table of the node computing device to the forward stack of identifiers; and
sending the forward stack of identifiers to the second node computing device; and
if the node computing device is not a neighbor node of the destination node computing device:
sending, by the node computing device, the notification and a separate forward stack of identifiers to each of one or more neighbor node computing devices of the node computing device in the network, wherein each separate forward stack of identifiers comprises a unique identifier for the neighbor node computing device to which the forward stack of identifiers is sent and unique identifiers from the forward stack of identifiers received by the node computing device.

7. The computer-implemented method of claim 6, further comprising receiving, from each of the one or more neighbor node computing devices to which the notification was sent, a forward stack of identifiers comprising a completed route to the destination node or a failure message.

8. The computer-implemented method of claim 7, further comprising sending the received forward stacks of identifiers and failure messages to the second node computing device.

9. The computer-implemented method of claim 7, wherein each of the received forward stacks of identifiers comprising a completed route comprises at least one unique identifier that is not resolvable to an address by the node computing device.

10. The computer-implemented method of claim 6, wherein the unique identifier for the destination node computing device is resolvable to the address in the network of the destination node computing device only using the peer table of the node computing device.

11. A computer-implemented method comprising:
receiving, at a node computing device in a network, a message and a forward stack of identifiers from another node computing device in the network;
resolving, by the node computing device, a first unique identifier in the forward stack of identifiers to an address of a next node computing device in a route using a peer table of the node computing device, wherein the first unique identifier is only resolvable to the address of the next node computing device in the route using the peer table of the node computing device;
removing, by the node computing device, the first unique identifier from the forward stack of identifiers; and
sending, by the node computing device, the message to the next node computing device in the route using the address, wherein each unique identifier in the forward stack of identifiers is resolvable to an address using a peer table of a node computing device that added the unique identifier to the forward stack of identifiers and is not resolvable to an address using the peer table of any other node computing device in the network.

12. The computer-implemented method of claim 11, further comprising:
after removing, by the node computing device, the first unique identifier from the forward stack of identifiers, determining that the forward stack of identifiers is not empty; and
sending, by the node computing device, the forward stack of identifiers to the next node computing device in the route using the address.

13. The computer-implemented method of claim 11, further comprising receiving, at the node computing device, a return stack of identifiers along with the message and the forward stack of identifiers from the second node computing device in the network, wherein the return stack of identifiers, wherein the return stack of identifiers comprises one or more unique identifiers that are not resolvable to an address using the peer table of the node computing device;
adding a unique identifier for the second node computing device from the peer table to the return stack of identifiers, wherein the unique identifier for the second node computing device is only resolvable to an address using the peer table of the node computing device; and
sending, by the node computing device, the return stack of identifiers to the next node computing device in the route using the address.

14. The computer-implemented method of claim 11, further comprising:
creating a return stack of identifiers;
adding a unique identifier for the second node computing device from the peer table to the return stack of identifiers wherein the unique identifier for the second node computing device is only resolvable to an address using the peer table of the node computing device; and
sending, by the node computing device, the return stack of identifiers to the next node computing device in the route using the address.

15. A system comprising: one or more computers and one or more storage devices storing instructions which are operable, when executed by the one or more computers, to cause the one or more computers to perform operations comprising:
receiving, at a node computing device in a network, from another node computing device in the network, a notification comprising an indication of a destination node computing device and a forward stack of identifiers comprising one or more unique identifiers, wherein each unique identifier in the forward stack of identifiers is resolvable to an address using a peer table of a node computing device that added the unique identifier to the forward stack of identifiers and is not resolvable to an address using the peer table of any other node computing device in the network;
if the node computing device is a neighbor of the destination node computing device:
adding a unique identifier for the destination node computing device from a peer table of the node computing device to the forward stack of identifiers; and
sending the forward stack of identifiers to the second node computing device; and
if the node computing device is not a neighbor node of the destination node computing device:
sending, by the node computing device, the notification and a separate forward stack of identifiers to each of one or more neighbor node computing devices of the node computing device in the network, wherein each separate forward stack of identifiers comprises a unique identifier for the neighbor node computing device to which the forward stack of identifiers is sent and unique identifiers from the forward stack of identifiers received by the node computing device.

16. The system of claim 15, wherein the instructions further cause the one or more computers to perform operations further comprising receiving, from each of the one or more neighbor node computing devices to which the notification was sent, a forward stack of identifiers comprising a completed route to the destination node or a failure message.

17. The system of claim 16, wherein the instructions further cause the one or more computers to perform operations further comprising receiving, from each of the one or more neighbor node computing devices to which the notification was sent, a forward stack of identifiers comprising a completed route to the destination node or a failure message.

18. The system of claim 16, wherein each of the received forward stacks of identifiers comprising a completed route comprises at least one unique identifier that is not resolvable to an address by the node computing device.

* * * * *